US010963377B2

(12) United States Patent
Iyer et al.

(10) Patent No.: US 10,963,377 B2
(45) Date of Patent: Mar. 30, 2021

(54) COMPRESSED PAGES HAVING DATA AND COMPRESSION METADATA

(71) Applicant: Hewlett Packard Enterprise Development LP, Houston, TX (US)

(72) Inventors: Shankar Iyer, Cupertino, CA (US); Srinivasa D Murthy, Cupertino, CA (US); Siamak Nazari, Mountain View, CA (US); Gilad Sade, Nashua, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 205 days.

(21) Appl. No.: 16/096,582

(22) PCT Filed: Apr. 29, 2016

(86) PCT No.: PCT/US2016/030082
§ 371 (c)(1),
(2) Date: Oct. 25, 2018

(87) PCT Pub. No.: WO2017/188985
PCT Pub. Date: Nov. 2, 2017

(65) Prior Publication Data
US 2019/0138446 A1 May 9, 2019

(51) Int. Cl.
*G06F 12/08* (2016.01)
*G06F 12/0802* (2016.01)
(Continued)

(52) U.S. Cl.
CPC ...... *G06F 12/0802* (2013.01); *G06F 12/0886* (2013.01); *G06F 12/0897* (2013.01);
(Continued)

(58) Field of Classification Search
CPC ............ G06F 12/0802; G06F 12/0866; G06F 12/0897; G06F 2212/1024; G06F 12/1009; G06F 2212/401; G06F 2212/652
(Continued)

(56) References Cited

U.S. PATENT DOCUMENTS 5,699,539 A   12/1997  Garber et al.
7,840,877 B2  11/2010  Jacobson
(Continued)

FOREIGN PATENT DOCUMENTS

CN   101739359       6/2010
CN   102708067 A    10/2012
(Continued)

OTHER PUBLICATIONS

Citrix, "Understanding Garbage Collection and Coalesce Process Troubleshooting," Jun. 2015, 5 pages, available at http://support.citrix.com/article/CTX201296.
(Continued)

*Primary Examiner* — Hua J Song
(74) *Attorney, Agent, or Firm* — Hewlett Packard Enterprise Patent Department

(57) ABSTRACT

Examples include compressed pages having data and compression metadata. Some examples include receiving a write request containing write data, storing the write data in data cache, and applying a page fit process to the write data. In some such examples, a virtual page table entry in a virtual page table may be generated for the processed write data. The virtual page table entry may include a compression index and a page address. An inline compression of the processed write data may be performed to compress and store the processed write data in a compressed page at a location associated with the compression index. In some examples, the compressed page may include a compression
(Continued)

metadata having a reference count, a compressed page offset, and a virtual page address.

16 Claims, 11 Drawing Sheets

(51) Int. Cl.
*G06F 12/0886* (2016.01)
*G06F 12/1009* (2016.01)
*G06F 12/0897* (2016.01)

(52) U.S. Cl.
CPC .. *G06F 12/1009* (2013.01); *G06F 2212/1024* (2013.01); *G06F 2212/401* (2013.01); *G06F 2212/652* (2013.01)

(58) Field of Classification Search
USPC .......................................................... 711/118
See application file for complete search history.

(56) References Cited

U.S. PATENT DOCUMENTS

| | | | |
|---|---|---|---|
| 8,190,850 B1 | 5/2012 | Davenport et al. | |
| 8,538,936 B2 | 9/2013 | Williams et al. | |
| 8,615,500 B1 | 12/2013 | Armangau et al. | |
| 8,694,703 B2 | 4/2014 | Hans et al. | |
| 8,700,865 B1 | 4/2014 | Van Dyke et al. | |
| 8,832,142 B2 | 9/2014 | Marwah et al. | |
| 8,838,890 B2 | 9/2014 | Gupta et al. | |
| 8,892,846 B2 | 11/2014 | Pruthi et al. | |
| 9,026,740 B1 | 5/2015 | Shilane et al. | |
| 9,058,212 B2 | 6/2015 | Wang et al. | |
| 10,102,148 B2 | 10/2018 | Bak et al. | |
| 2002/0178333 A1 | 11/2002 | Wilson et al. | |
| 2006/0005069 A1 | 1/2006 | Gaertner | |
| 2006/0212672 A1 | 9/2006 | Chandrasekaran et al. | |
| 2008/0307174 A1 | 12/2008 | Garst et al. | |
| 2011/0087840 A1 | 4/2011 | Glasco et al. | |
| 2011/0099321 A1 | 4/2011 | Haines et al. | |
| 2011/0307447 A1 | 12/2011 | Sabaa et al. | |
| 2012/0110239 A1* | 5/2012 | Goss | G06F 12/0246 711/103 |
| 2013/0282676 A1 | 10/2013 | Wade et al. | |
| 2014/0372689 A1 | 12/2014 | Colgrove et al. | |
| 2015/0100736 A1 | 4/2015 | Galbraith et al. | |
| 2015/0242432 A1 | 8/2015 | Bak et al. | |

FOREIGN PATENT DOCUMENTS

| | | |
|---|---|---|
| CN | 105474180 A | 4/2016 |
| EP | 0976045 B1 | 4/2002 |
| WO | WO-2015024504 | 2/2015 |

OTHER PUBLICATIONS

Hayes, J., Excerpts from video: "Building Commercial Storage Systems from Consumer SSDs," Oct. 1, 2012, https://vimeo.com/50557873, 18 pages.

Hayes, J., "Building Commercial Storage Systems from Consumer SSDs," Oct. 1, 2012, (Presentation Slides), http://www.snia.org/sites/default/orig/SDC2012/presentations/Solid_State/JohnHayes_Enterprise_Storage_Systems.pdf.

International Search Report & Written Opinion received in PCT Application No. PCT/US2016/030082, dated Jan. 18, 2017, 12 pages.

Oracle Corporation, "Oracle Advanced Compression with Oracle Database 12c Release 2," (Research Paper), Oracle White Paper, Nov. 2016, 18 pages, available at http://www.oracle.com/technetwork/database/options/compression/advanced-compression-wp-12c-1896128.pdf.

Shankar Iyer, "Compressed Pages Having Data and Compression," Application Serial No. PCT/US2016/030082, filed Apr. 29, 2016, 53 pps.

Wu, X. et al., "Selfie: Co-locating Metadata and Data to Enable Fast Virtual Block Devices," (Research Paper), May 26-28, 2015, 11 pages, available at http://www.ece.eng.wayne.edu/~sjiang/pubs/papers/wu15-selfie.pdf.

Extended European Search Report received in EP Application No. 16895741.3, dated Oct. 24, 2018.

* cited by examiner

COMPRESSED PAGES HAVING DATA AND COMPRESSION METADATA

BACKGROUND

Storage solutions may be tasked with quickly and efficiently storing and retrieving large amounts of data with a finite amount of processing power, bandwidth, and memory. Virtualization of memory, in which virtual memory addresses are mapped to physical memory addresses, may be used to improve memory efficiency. In some examples, memory may be thin-provisioned within a virtualized memory system such that memory space is flexibly allocated between processes, tasks, or users as needed, allowing for the amount of allocated virtual memory to exceed the total amount of physical memory. Metadata may be used in some such examples to facilitate discovery and retrieval of data.

BRIEF DESCRIPTION OF THE DRAWINGS

The following detailed description references the drawings, wherein.

DETAILED DESCRIPTION

Figure 1A:
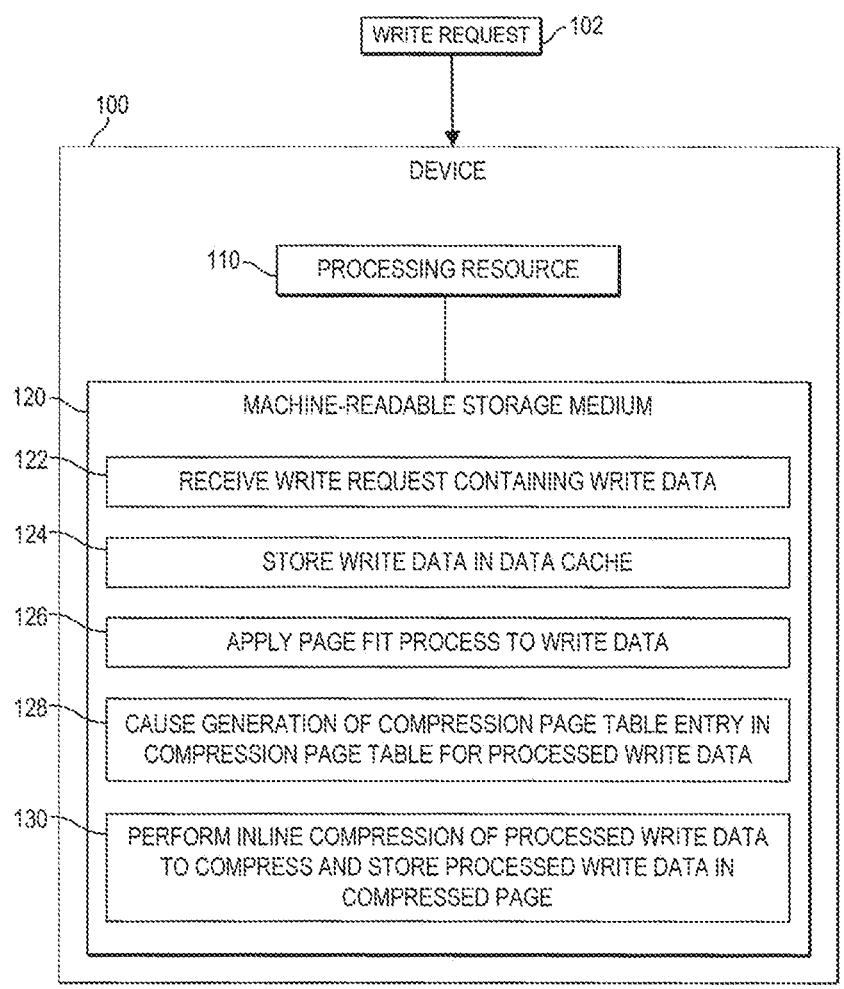
FIG. 1A is a block diagram of an example machine-readable storage medium including instructions to apply a page fit process to write data and to perform an inline compression of the processed write data that compresses and stores the processed write data in a compressed page that includes compression metadata.

Large amounts of data may need to be quickly and efficiently stored and retrieved using a finite amount of processing power, bandwidth, and memory. In some examples, memory management techniques may be used to generate a virtual memory system that may allow memory to appear as large, contiguous address spaces to processes or tasks. However, those addresses (i.e., virtual memory addresses) may or may not correspond to contiguous physical memory addresses.

Thin-provisioning techniques may also be used, Such techniques may involve memory that appears to be allocated when requested. In actuality, however, physical memory is allocated when necessary, for instance when data is actually written to storage media. In addition, data compression techniques may be used to maximize storage capacity. In some examples, data may be compressed before being written to memory. Data compression may involve transmitting or storing data of a certain number of bits in a fewer number of bits via a compression algorithm. In some examples, data compression may involve encoding the data using fewer bits that the data's original representation. In other examples, data compression may involve reducing the size of the data by eliminating redundant or unnecessary bits.

The use of such memory management techniques may involve overhead and/or data structures not present in memory systems that do not utilize such techniques. For instance, in a virtual memory system, because processes and tasks may utilize virtual memory addresses, the system may translate the virtual memory addresses to corresponding physical memory addresses. In some examples, a page table populated by one or more page table entries may enable a virtual memory system to associate virtual memory addresses with physical memory addresses. Each page table entry may include suitable metadata, i.e., data that provides information about other data. For example, the metadata may include a virtual page number and a physical page number that can be used to generate a physical memory address.

While page tables may be used to facilitate the discovery and retrieval of data, they may also involve greater memory and bandwidth usage and added latency. For instance, a single memory operation involving a virtual memory address may first involve looking up a page table entry in a page table to determine a physical memory address. Next, it may involve accessing the storage media at the physical memory address. Thus, each such memory operation would involve at least two memory accesses, one to access the page table entry and the other to access the physical memory address within the storage media, Some memory operations may involve even more accesses. For instance, reading and modifying data may involve additional memory accesses to modify or update the page table entry of the original data and/or to add a new page table entry for the new data.

Similarly, systems that utilize data compression may include a table having metadata relevant to compression and/or decompression of the data. In such systems, a single memory operation may involve looking up such metadata before accessing the compressed data at the storage media.

In some examples, metadata may be located together, for instance in a table or index, on the same data storage unit as the data to which it relates. Nevertheless, multiple memory accesses may still be needed to access first the metadata and next the data. In other examples, where redundancy and fault tolerance may be important, metadata may be located together in, for example, a page table, and further duplicated at another location, for example, a data block. Duplicating the metadata in such a manner may allow the page table to be reconstructed after a failure and, in some instances, may allow for reconstruction without added memory accesses for each memory operation. However, memory accesses per memory operation may not be diminished in comparison to systems that do not require such duplication, meaning undue bandwidth usage, overprovisioning of memory to accommodate certain memory operations, and added latency.

Examples described herein may improve memory management of finite storage resources via a page fit process and an inline compression of data and metadata to a compressed page, which may involve fewer memory accesses for certain memory operations. For instance, some examples described herein may receive a write request, a read request, or a read-modify-write request to modify and rewrite data. In such examples, based on the request received, a virtual page table entry may be generated and the data may be stored in a compressed page together with compression metadata. In other such examples, based on the request received, data may be located via the virtual page table entry and the compression metadata. In yet other such examples, based on the request, a page re-fit process may be applied and a new compressed page may be created or data in an existing compressed page may be modified.

In some examples described herein, a processing resource of a device may execute instructions on a machine-readable storage medium to receive a write request containing write data, store the write data in a data cache, and apply a page-fit process to the write data. The processing resource may further execute instructions to cause the generation of a virtual page table entry in a virtual page table for the processed write data. The virtual page table entry may include a compression index and a page address. The processing resource may also execute instructions to perform an inline compression of the processed write data to compress and store the processed write data in a compressed page at a location associated with the compression index. The compressed page may include compression metadata having a reference count, a compressed page offset, and a virtual page address.

In some such examples described herein, the processing resource of the device may execute instructions to receive a read request for the write data and determine whether the write data is located in a data cache. Based (at least in part) on a determination that the write data is not located in the data cache, the processing resource may execute instructions to determine whether the write data is located in a compressed cache. Based (at least in part) on a determination that the write data is not located in the compressed cache, the processing resource may locate the write data via the virtual page table and the compression metadata and decompress the write data. In examples described herein, a determination, action, etc., that is said to be "based on" a given condition may be based on that condition alone or based on that condition and other condition(s).

In other such examples described herein, the processing resource of the device may additionally execute instructions to receive a read-modify-write request to modify the write data and re-write modified write data. The processing resource may execute instructions to store the modified write data in the data cache and apply a page re-fit process to the modified write data to determine whether the modified write data will fit in the compressed page at the location associated with the compression index. Based (at least in part) on a determination that the modified write data will fit, the processing resource may execute instructions to perform an inline compression of the modified write data to compress and store the modified write data in the compressed page at the location associated with the compression index.

Based (at least in part) on a determination that the modified write data will not fit, the processing resource may execute instructions to cause the generation of a new virtual page table entry in the virtual page table for the modified write data. The new virtual page table entry may include a new compression index and a new page address. Also based (at least in part) on the determination, the processing resource may further execute instructions to perform an inline compression of the modified write data to compress and store the modified write data in a new compressed page. The new compressed page may include a new compression metadata having a new reference count, a new compressed page offset, and a new virtual page address. In addition, based (at least in part) on the determination that the modified write data will not fit, the processing resource may execute instructions to update the compression metadata of the compressed page.

In some examples described herein, a device may include a processing resource, a data cache, a compressed cache, and a machine-readable storage medium including instructions to receive a write request containing write data, store the write data in a data cache, and apply a page fit process to the write data that generates a compression metadata for a compressed page that includes a reference count, a compressed page offset, and a virtual page address. The storage medium may further comprise instructions to cause the generation of a virtual page table entry in a virtual page table for the processed write data. The virtual page table entry may include a compression index and a page address. The storage medium may also include instructions to perform an inline compression of the processed write data to compress and store the processed write data in the compressed page at a location associated with the compression index. The compressed page may include the compression metadata having the reference count, the compressed page offset, and the virtual page address.

In some examples described herein, a method for managing memory may involve receiving, at a device, a write request containing write data and storing, at the device, the write data in a data cache. The method may further involve applying a page fit process to the write data and generating a virtual page table entry in a virtual page table for the processed write data. The virtual page table entry may include a compression index and a page address. The method may also involve performing an inline compression of the processed write data to compress and store the processed write data in a compressed page at a location associated with the compression index. The compressed page may include a compression metadata having an algorithm and version identifier, a reference count, a compressed page offset, a virtual page address, and an unused space identifier.

Referring now to the drawings, FIG. 1A is a block diagram of an example machine-readable storage medium 120 that includes instructions to receive a write request 102 containing write data and compress and store the write data in a compressed page that includes compression metadata. The instructions may be executable by a processing resource 110 of a device 100.

Device 100 includes a processing resource 110 and may be any networking or computing device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource.

As depicted in FIG. 1A, device 100 may also include a machine-readable storage medium 120 comprising (e.g., encoded with) instructions 122, 124, 126, 128, and 130 executable by processing resource 110 to implement functionalities described herein in relation to FIG. 1A. In some examples, storage medium 120 may include additional instructions. In other examples, the functionalities described herein in relation to instructions 122, 124, 126, 128, 130, and any additional instructions described herein in relation to storage medium 120, may be implemented at least in part in electronic circuitry (e.g., via components comprising any combination of hardware and programming to implement the functionalities described herein). In some examples, device 100 may be a controller node for a storage platform or may be located within a controller node for a storage platform. In some examples (not shown in FIG. 1A), storage medium 120 may be located outside of device 100. In such examples, device 100 may communicate via a computer network (e.g., Internet, Local Area Network (LAN), Wide Area Network (WAN), etc.) with storage medium 120.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above in relation to instructions 122, 124, 126, 128, and 130. In other examples, the functionalities of any of the instructions of storage medium 120 may be implemented in the form of electronic circuitry, in the form of executable instructions encoded on a machine-readable storage medium, or a combination thereof. In the example of FIG. 1A, storage medium 120 may be implemented by one machine-readable storage medium, or multiple machine-readable storage media.

In the example of FIG. 1A, instructions 122 may receive a write request 102 containing write data. A write request, as described herein, may refer to a message or command to store write data. In some examples, write request 102 may be received from a user (e.g., saving a file). In other examples, write request 102 may be received from a process or task as part of a larger transaction or operation. The write data may refer to any characters, symbols, or information in the form of electrical signals to be recorded on magnetic, optical, mechanical, or electronic media. In some examples, upon receiving write request 102 containing write data, the write data may be assigned or allocated a virtual page number or virtual page address. In one such example, the write data may fit in a single virtual page. In another such example, the write data may comprise several virtual pages.

Instructions 124 may receive the write data from write request 102 and store the write data in a data cache. A data cache, as used in examples herein, may refer to any component that stores data such that future requests for that data may be served or completed more quickly than if that data were to be stored in a slower data source such as a remote server. In some examples, the data cache may be located on the processing resource 110 or device 100. In other examples, the data cache may be located on storage medium 120, either on or off device 100. In other examples, the data cache may be located in primary memory. In yet other examples, the data cache may be located in secondary memory. The data cache may temporarily or more permanently store any data to be stored in or read from memory. The data cache may also store any data requested or predicted to be needed by processing resource 110 and/or any data that is frequently used by processing resource 110. Any or all data within the data cache may be part of a data set that includes the write data from write request 102.

Instructions 126 may analyze the data in the data cache and apply a page fit process to the write data. In the examples described herein, a page may refer to a specific quantity of data. For example, a page may be a sequence of N bytes, where N is a power of 2. In examples involving virtual memory, a page may be 4 KiloBytes (KB) to 64 KB or more. The page fit process may determine a best fit for data in a compressed page. A compressed page, as used in examples herein, refers to a page that includes compressed data and metadata. In some examples, the compressed data may include several virtual pages of data. In one example, a compressed page may include up to eight virtual pages. In other examples, the compressed page may include even more virtual pages depending on the size of the page, the amount of compression achieved, available memory space, and other such relevant variables. The compressed page is described in more detail below with respect to FIG. 5.

Instructions 126, in some examples, may include instructions to determine a best fit based on a data set within the data cache that includes the write data. In some examples, the page fit process may estimate or predict a size of the write data after compression. The page fit process may estimate this size based on one or more compression algorithms. The page fit process may similarly estimate or predict the size(s) of other data within the data cache after compression. The page fit process may estimate the size(s) based on one or more compression algorithms. Based (at least in part) on the estimated sizes of the write data as well as other data within the data cache after compression, the page fit process may ascertain a compressed page with a "best fit" and which has a suitable number of virtual pages of data and is organized in a suitable order. In some examples, the page fit process may analyze whether the write data and other data within the data cache may be accessed together in ascertaining which data to include in a compressed page. In other examples, the page fit process may analyze how frequently or infrequently data may be accessed in determining which data to include in the compressed page. Very frequently accessed data, in some such examples, may not be included in the compressed page. In some examples, the page fit process may generate or determine a compression index and a page address, described in more detail below in relation to instructions 128, for the write data and other data within the compressed page. The page fit process may additionally, in some examples, generate or determine compression metadata, described in more detail below in relation to instructions 130, for the data within the compressed page.

After the write data from write request 102 has been processed by the page fit process, instructions 128 may cause the generation of a virtual page table entry in a virtual page table for the processed write data. In some examples, instructions 128 may cause the generation of a virtual page table entry based on information received or obtained from the page fit process. As used in the examples herein, a virtual page table may refer to a table or other suitable data structure that includes one or more virtual page table entries. A virtual page table entry, as used in the examples herein, may refer to a row, a line, or other suitable portion of a virtual page table that aids in associating a virtual memory address with a physical memory address by way of compression metadata. The data or information within the virtual page table entry may be referred to as metadata. As used herein, metadata may refer to data that provides information about other data.

In some examples, a virtual page table entry is associated with a virtual page number or virtual page address and includes a compression index and a page address. The compression index may refer to a particular virtual page within a compressed page. For example, for a compressed page that may hold up to eight virtual pages, the compression index may include a value between 0-7, with each value being associated with a different virtual page. For a compressed page that may hold fewer virtual pages, the compression index may be correspondingly lower. Likewise, for a compressed page that may hold a greater number of virtual pages, the compression index may be correspondingly higher.

In some examples, the page address of a compression table entry may refer to a physical page. In some such examples, the page address may be a physical page address for a compressed page. In other such examples, the page address may be a physical page number from which a physical page address can be generated for a compressed page.

In some examples, instructions 128 may cause the generation of a virtual page table in which each virtual page table entry corresponds to a compressed page in memory. In other examples, each virtual page table entry may correspond to a page in memory, with a subset of the pages being compressed pages and another subset of the pages being uncompressed pages. In such examples, the compression index for an uncompressed page may include a null character or other value to indicate that the page does not include compressed data.

Figure 4:
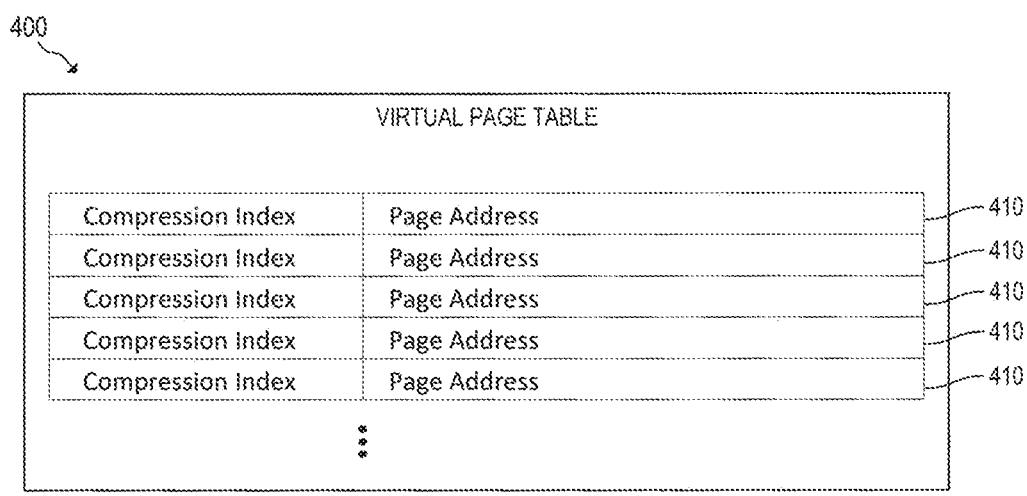
FIG. 4 is a block diagram of an example virtual page table having virtual page table entries with a compression index and a page address.

FIG. 4 depicts an example virtual page table 400 that includes several virtual page table entries 410. As depicted, each virtual page table entry includes a compression index and a page address. In some examples, virtual page table 400 may include additional metadata not shown in FIG. 4. For example, virtual page table 400 may include a valid bit to indicate whether the page is in primary memory. An indication that the page is not in primary memory may correspond to a page fault and may involve an additional memory access to determine a page address for the physical page.

Returning to FIG. 1A, instructions 130 may receive or otherwise obtain processed write data (as well as any other data to be stored in the compressed page) from the data cache after the page fit process has been applied. In some examples, instructions 130 may receive or otherwise obtain one or more virtual pages of data, including the processed write data, to be compressed into a compressed page. In one such example, the processed write data may be one (or more) of several virtual pages to be compressed into a single compressed page. Instructions 130 may perform an inline compression of the processed write data (and any other data to be stored in the compressed page) to store the processed write data in a compressed page as compressed write data. Inline compression may be achieved using any of a number of suitable compression algorithms, including (but not limited to) Lempel-Ziv-Oberhumer® (LZO), LZ77®, LZ40, and Snappy®.

The processed write data may be stored in the compressed page at a location associated with the compression index in the page compression table entry. For example, a compression index of "0" may indicate that the processed write data is located as the first virtual page within the compressed page. Similarly, a compression index of "1" may indicate that the processed write data is located as the second virtual page within the compressed page. In such an example, the first virtual page may be occupied by other data. In some examples, the compressed page may be stored in secondary memory, tertiary memory, or off-line or external memory.

In addition to compressed data, the compressed page may include compression metadata associated with the compressed data. In some examples, instructions 130 may receive compression metadata from the page fit process for the compressed page. As used herein, compression metadata may refer to data within the compressed page that provides information about compressed data in the compressed page. In some examples, instructions 130 may perform an inline compression of the compression metadata along with the processed write data and any other data to be stored in the compressed page. In other examples, instructions 130 may perform an inline compression of just the processed write data (and any other data to be stored in the compressed page) and the compression data may be stored in the compressed page in an uncompressed format.

The compression metadata may include, among other things, a reference count, a compressed page offset, and a virtual page address. Each of the reference count, the compressed page offset, and the virtual page address may represent separate fields made up of one or more bits that provide information about the compressed page and the compressed data within the compressed page.

In some examples, the reference count may refer to the number of virtual pages within the compressed page. For instance, for a compressed page that includes two virtual pages, the reference count may include the value "2" or may otherwise indicate that the compressed page includes two virtual pages. Similarly, for a compressed page that includes 8 virtual pages, the reference count may include the value "8" or may otherwise indicate that the compressed page includes eight virtual pages.

In some examples, the compressed page offset may refer to an offset that specifies where the data associated with each virtual page in a compressed page is located within that compressed page. In some such examples, each virtual page within a compressed page may be associated with its own compressed page offset. Accordingly, a compressed page holding several virtual pages may have several different compressed page offset fields. The compressed page offset may be represented by a byte number. In one example in which the processed write data may be stored in a first virtual page within the compressed page, the compressed page offset for the processed write data may be "0." In another example in which the processed write data may be stored in a first virtual page within the compressed page, but the compressed page begins with compression metadata, the compressed page offset for the processed write data may be a byte value that reflects the size of the compression metadata. Similarly, in an example in which the processed write data may be stored as a second virtual page within the compressed page, the compressed page offset for the processed write data may be a byte value that reflects the size of the data in the first virtual page. The compressed page offset for each virtual page within the compressed page may allow for easy calculation of the size of the virtual pages.

In some examples, the virtual page address may refer to a virtual page. In some such examples, the virtual page address may be an address for a virtual page. In other such examples, the virtual page address may be a virtual page number from which a virtual page address can be generated for a virtual page. In some examples, each virtual page within a compressed page may be associated with its own virtual page address. The virtual page address may allow for efficient look-up of a virtual page's corresponding virtual page table entry when necessary.

The compression metadata may, in some examples, include additional metadata such as an algorithm and version identifier or an unused space identifier. The algorithm and version identifier and the unused space identifier may represent separate fields made up of one or more bits that provide additional information about the compressed page and the compressed data within the compressed page. In some examples, the algorithm and version identifier may identify the compression algorithm and the version of the compression algorithm used to compress the data. In some such examples, this may aid in decompression of the data within the compressed page.

In some examples, an unused space identifier may identify the amount of unused space at the end of the compressed page. In some examples, the unused space identifier may aid in determining the size of the last virtual page stored in the compressed page. In other examples, the unused space identifier may instead be a used length identifier.

Figure 5:
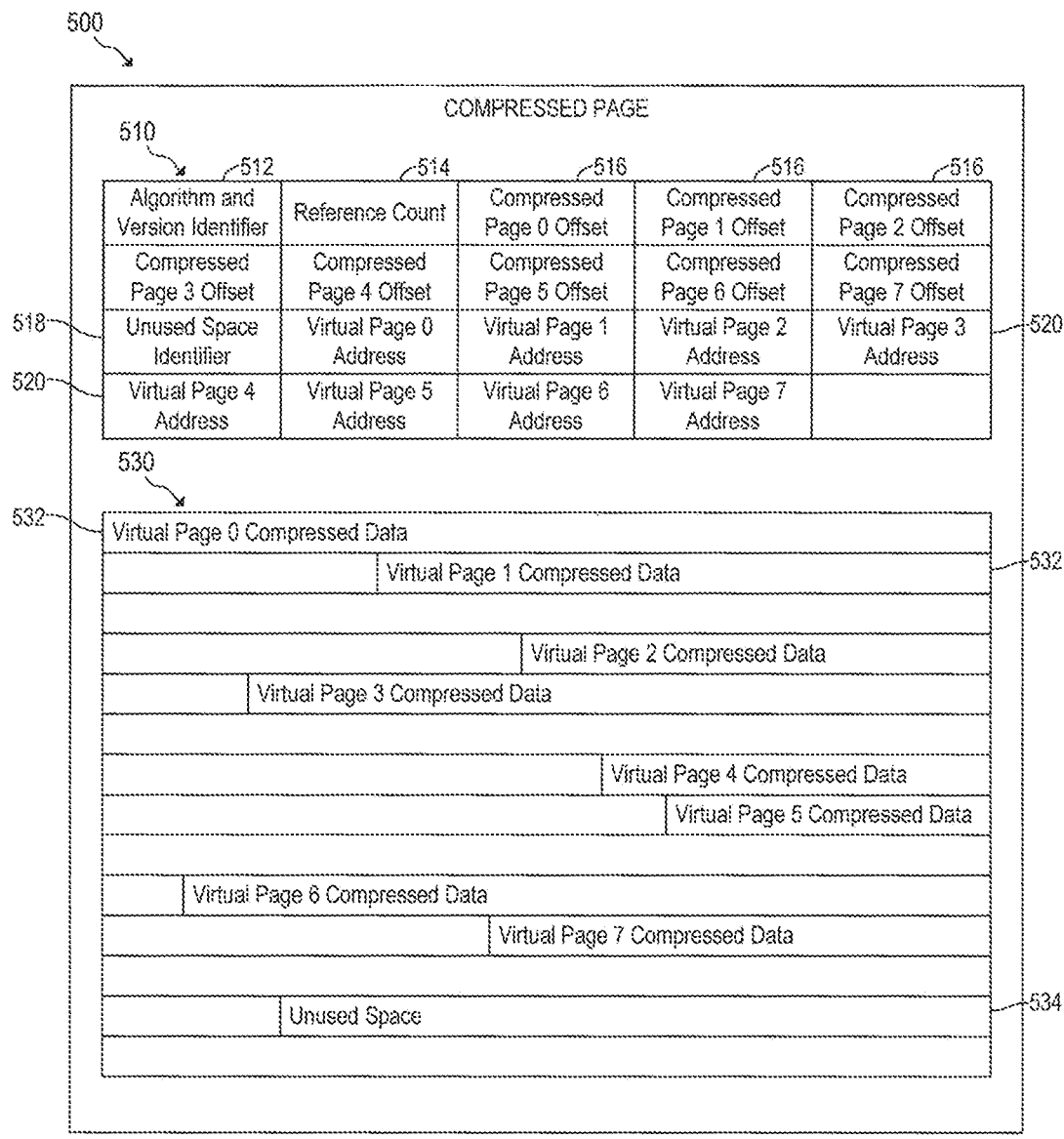
FIG. 5 is a block diagram of an example compressed page having compression metadata and compressed data.

FIG. 5 depicts a block diagram of an example compressed page 500 including compression metadata 510 and compressed data 530. In the example of FIG. 5, the compressed page includes eight virtual pages of compressed data. Compression metadata 510 includes algorithm and version identifier 512, reference count 514, compressed page offset 516, unused space identifier 518, and virtual page address 520. The algorithm and version identifier 512 may indicate the compression algorithm and compression algorithm version used to compress the compressed data 530, The reference count 514 may have a value of "8" to indicate that compressed page 500 includes eight virtual pages of data.

In the example of FIG. 5, each virtual page within the compressed page 500 may also have an associated compressed page offset 516. As shown in FIG. 5, a compression page that may hold up to eight virtual pages of compressed data may include eight compressed page offset fields. Accordingly, virtual page 0 would be associated with compressed page 0 offset, virtual page 1 would be associated with compressed page 1 offset, and so on. Each compressed page offset field may identify a byte location at which the compressed data begins within compressed page 500.

The unused space identifier 518 of FIG. 5 identifies the amount of unused space 534 within compressed page 500. In some examples, unused space identifier 518 may represent the amount of unused space 534 as a byte value. The virtual page address 520 may indicate the virtual page address of each virtual page within the compressed page. As shown, each of the eight virtual pages within compressed page 500 may have an associated virtual page offset. Accordingly, virtual page 0 would be associated with virtual page 0 address, virtual page 1 would be associated with virtual page 1 address, and so on. In some examples, virtual page address 520 is the virtual page address for the virtual page. In other examples, virtual page address 520 may be a virtual page number from which the virtual page address can be generated. Virtual page address 520 may allow for efficient look-up of a virtual page's corresponding virtual page table entry when necessary.

As shown in FIG. 5, compressed data 530 may include virtual page compressed data 532 for up to eight virtual pages and may also, in some examples, include unused space 534. Although not shown in FIG. 5, a compressed page may include fewer or more types of compression metadata 510. Likewise, a compressed page may include fewer or more virtual pages of compressed data 530. In addition, in the example of FIG. 5, the compression metadata 510 is shown before the compressed data 530, However, the compression metadata and compressed data may be organized and located in any suitable manner within the compressed page.

In some examples, instructions 122, 124, 126, 128, and 130 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 122, 124, 126, 128, and 130 may be part of an application, applications, or component(s) already installed on device 100 including processing resource 110. In such examples, the storage medium 120 may include memory such as a hard drive, solid state drive, or the like. In some examples, functionalities described herein in relation to FIG. 1A may be provided in combination with functionalities described herein in relation to any of FIGS. 1B-C and 2-5.

Figure 1B:
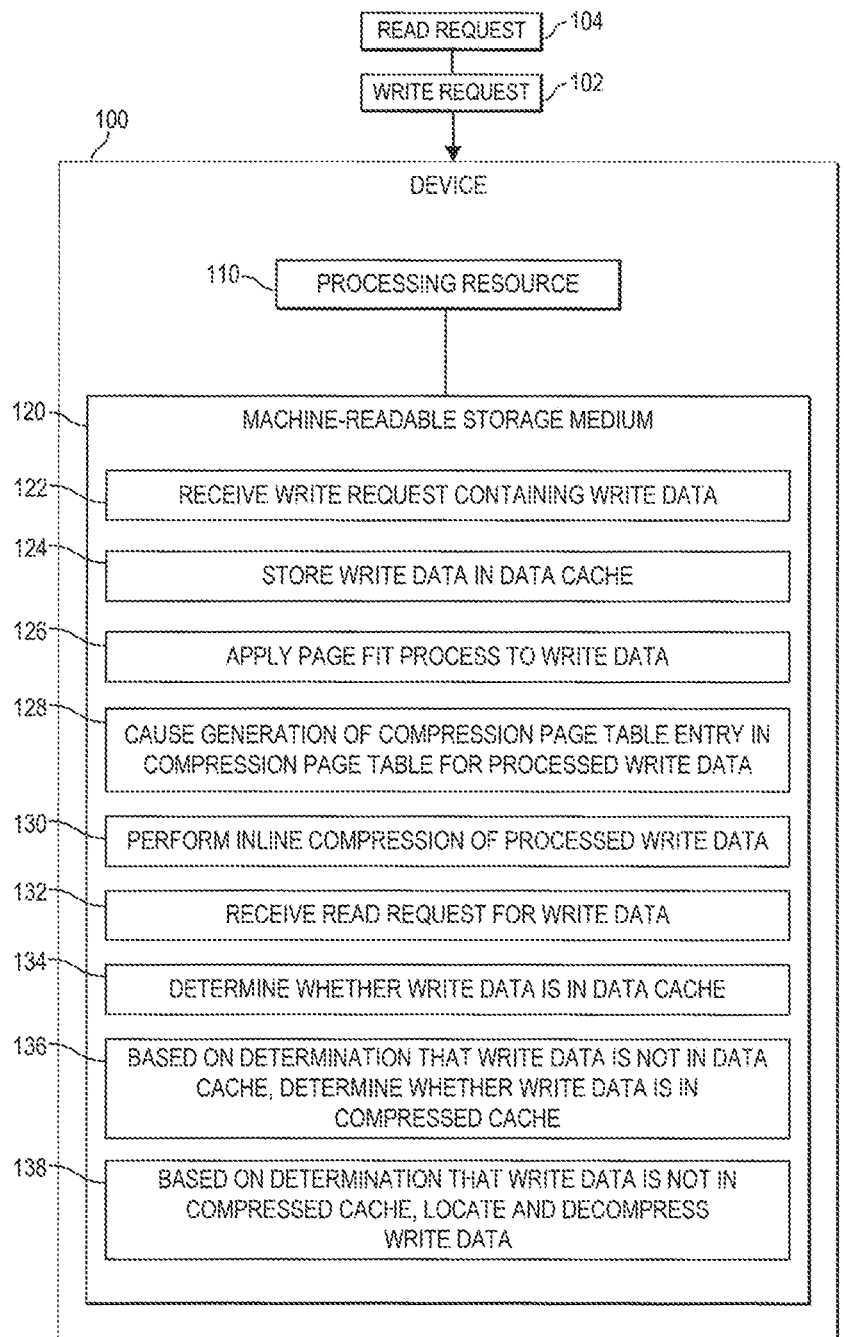
FIG. 1B is a block diagram of an example machine-readable storage medium including instructions to receive a read request for the write data, to determine a location of the write data, and based on the location, to decompress the write data.

Further examples are described herein in relation to FIG. 1B, which is a block diagram of an example machine-readable storage medium 120 that includes instructions to receive a read request 104 for write data, locate the write data, and, if necessary, decompress the write data. The example of FIG. 1B includes device 100, processing resource 110, and machine-readable storage medium 120 comprising instructions 122, 124, 126, 128, and 130, as described above in relation to FIG. 1A. The example of FIG. 1B further includes the machine-readable storage medium 120 comprising instructions 132, 134, 136, and 138 executable by processing resource 110 to implement functionalities described herein in relation to FIG. 1B.

In some examples, storage medium 120 may include additional instructions. In other examples, the functionalities described herein in relation to instructions 122, 124, 126, 128, 130, 132, 134, 136, 138, and any additional instructions described herein in relation to storage medium 120, may be implemented at least in part in electronic circuitry (e.g., via components comprising any combination of hardware and programming to implement the functionalities described herein), In some examples, device 100 may be a controller node for a storage platform or may be located within a controller node for a storage platform. In some examples (not shown in FIG. 1B), storage medium 120 may be located outside of device 100. In such examples, device 100 may communicate via a computer network (e.g., Internet, Local Area Network (LAN), Wide Area Network (WAN), etc.) with storage medium 120.

Processing resource 110 may fetch, decode, and execute instructions stored on storage medium 120 to perform the functionalities described above in relation to instructions 122, 124, 126, 128, 130, 132, 134, 136, and 138. In other examples, the functionalities of any of the instructions of storage medium 120 may be implemented in the form of electronic circuitry, in the form of executable instructions encoded on a machine-readable storage medium, or a combination thereof. In the example of FIG. 1B, storage medium 120 may be implemented by one machine-readable storage medium, or multiple machine-readable storage media.

As described above, in relation to FIG. 1A, instructions 122 may receive a write request 102 containing write data. Instructions 124 may receive the write data from write request 102 and store the write data in a data cache, Instructions 126 may analyze the data in the data cache, including the write data, and apply a page fit process to the write data. Instructions 128 may cause the generation of a virtual page table entry in a virtual page table for the processed write data. As described above in relation to FIGS. 1A and 4, the virtual page table entry may include a compression index and a page address. Instructions 130 may perform an inline compression of the processed write data to compress and store the processed write data in a compressed page at a location associated with the compression index. As described above in relation to FIGS. 1A and 5, the compressed page may include compressed data and compression metadata that may include a reference count, a compressed page offset, and a virtual page address.

In the example of FIG. 1B, instructions 132 may receive a read request 104 for write data 102. A read request, as described herein, may refer to a message or command to retrieve (i.e., read) data. In some examples, read request 104 may be received from a user (e.g., opening a file). In other examples, read request 104 may be received from a process or task as part of a larger transaction or operation. In some examples, read request 104 may include a virtual page address for the write data.

In response to receiving read request 104, instructions 134 may determine whether the write data is located in the data cache. In some examples, instructions 134 may search the data cache based (at least in part) on an address associated with the read request. In some such examples, instructions 134 may search an index, table, or other organizational structure associated with the data cache to determine whether the write data is located in the data cache. If the write data is located within the data cache, the write data may be retrieved for the requesting entity, completing the read request.

Based (at least in part) on a determination that the write data is not located in the data cache, instructions 136 may determine whether the write data is located in a compressed cache. A compressed cache, as used in examples herein, may refer to any component that stores a compressed page such that future requests for the compressed page may be served or completed more quickly than if the compressed page were to be stored in a slower data source such as a remote server. In some examples, the compressed cache may be located on the processing resource 110 or device 100. In other examples, the compressed cache may be located on storage medium 120, either on or off device 100. In other examples, the compressed cache may be located in primary memory. In yet other examples, the compressed cache may be located in secondary memory. The compressed cache may temporarily or more permanently store compressed pages to be stored in or read from memory. The compressed cache may also store any compressed pages requested or predicted to be needed by processing resource 110 and/or any compressed pages that are frequently used by processing resource 110.

In some examples, instructions 136 may search the data cache based (at least in part) on an address associated with the read request. In some such examples, instructions 136 may search an index, table, or other organizational structure associated with the compressed cache to determine whether the write data is located in the compressed cache. If the write data is located within the compressed cache, the write data may be retrieved and decompressed for the requesting entity, completing the read request.

Based (at least in part) on a determination that the write data is not located in the compressed cache, instructions 138 may locate and decompress the write data. In some examples, instructions 138 may locate the write data via the virtual page table and the compression metadata. For instance, in some such examples, read request 104 may include a virtual page address or virtual page number for the write data. Based (at least in part) on the virtual page address or virtual page number, instructions 138 may identify the virtual page table and the virtual page table entry within the virtual page table that are associated with the address. As described above in relation to FIG. 1A, the virtual page table entry may associate the virtual page address with a physical page address or physical page number. The virtual page table entry may additionally include a compression index that identifies a virtual page within the compressed page. Based (at least in part) on the page address from the virtual page table entry, instructions 138 may locate the compressed page within which the write data is located. In some examples, the compressed page may then be read (i.e., retrieved) and stored within the compressed cache. Instructions 138 may further locate the write data within the compressed page based (at least in part) on the compression index of the virtual page table entry and the compressed page offset of the compression metadata.

Upon locating the write data within the compressed page, instructions 138 may decompress the write data and send the data to the requesting entity. In some examples, instructions 138 may determine the compression algorithm and compression algorithm version from the compression metadata to aid in decompressing the write data. In other examples, instructions 138 may check the virtual page address within the compression metadata to confirm the write data has been located prior to decompression. In some examples, the decompressed write data may be stored in the data cache before it is sent to the requesting entity.

In some examples, instructions 122, 124, 126, 128, 130, 132, 134, 136, and 138 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 122, 124, 126, 128, 130, 132, 134, 136, and 138 may be part of an application, applications, or component(s) already installed on device 100 including processing resource 110. In such examples, the storage medium 120 may include memory such as a hard drive, solid state drive, or the like. In some examples, functionalities described herein in relation to any of FIG. 1B may be provided in combination with functionalities described herein in relation to any of FIGS. 1A, 1C and 2-5.

Figure 1C:
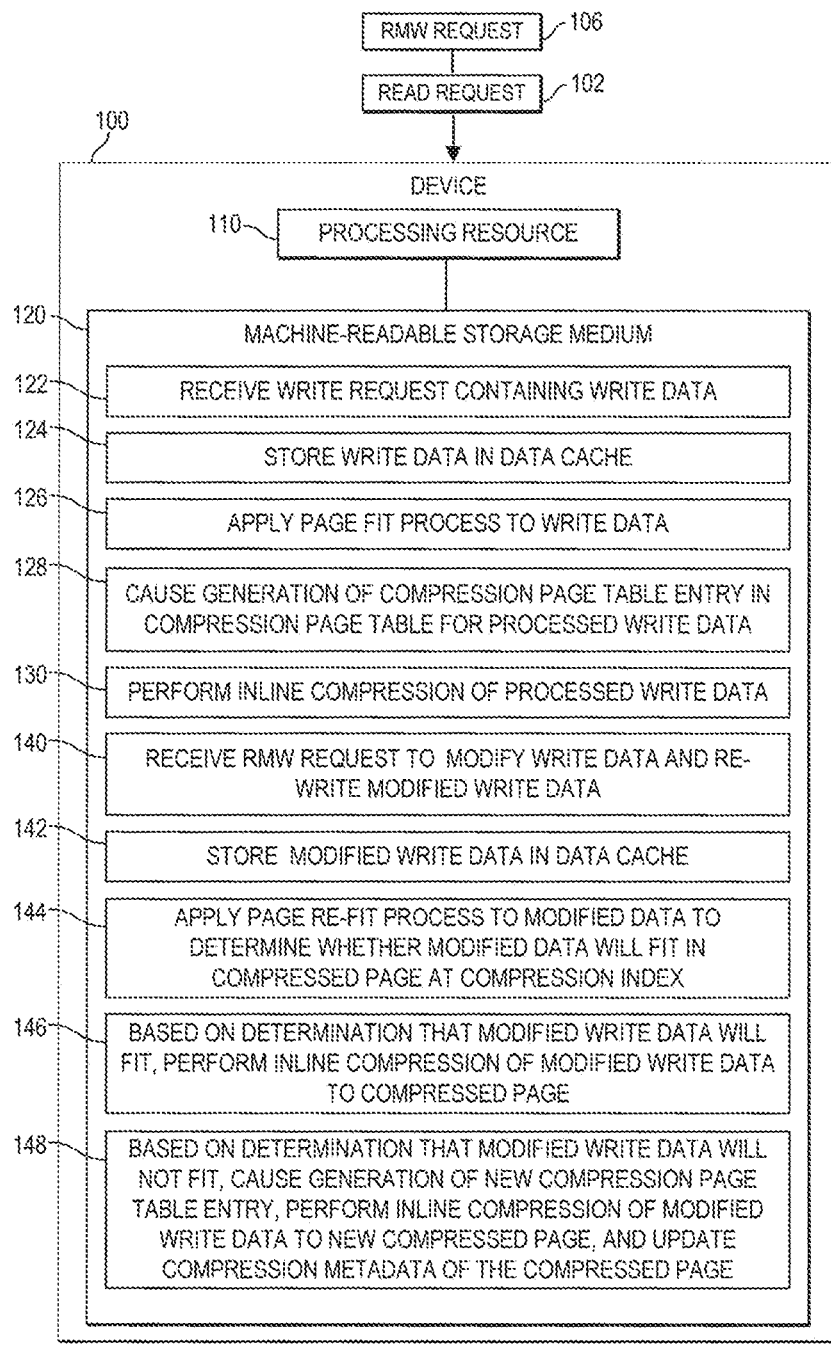
FIG. 1C is a block diagram of an example machine-readable storage medium including instructions to receive a read-modify-write request to modify the write data and to apply a page re-fit process to determine whether the modified write data will fit in the compressed page.

Further examples are described herein in relation to FIG. 1C, which is a block diagram of an example machine-readable storage medium that includes instructions to receive a read-modify-write request to modify the write data and to apply a page re-fit process to determine whether the modified write data will fit in the compressed page. The example of FIG. 1C includes device 100, processing resource 110, and machine-readable storage medium 120 comprising instructions 122, 124, 126, 128, and 130 as described above in relation to FIG. 1A. The example of FIG. 1C further includes the machine-readable storage medium 120 comprising instructions 140, 142, 144, 146, and 148 executable by processing resource 110 to implement functionalities described herein in relation to FIG. 1C.

In some examples, storage medium 120 may include additional instructions. In other examples, the functionalities described herein in relation to instructions 122, 124, 126, 128, 130, 140, 142, 144, 146, 148, and any additional instructions described herein in relation to storage medium 120, may be implemented at least in part in electronic circuitry (e.g., via components comprising any combination of hardware and programming to implement the functionalities described herein). In some examples, device 100 may be a controller node for a storage platform or may be located within a controller node for a storage platform. In some examples (not shown in FIG. 1C), storage medium 120 may be located outside of device 100. In such examples, device 100 may communicate via a computer network (e.g., Internet, Local Area Network (LAN), Wide Area Network (WAN), etc.) with storage medium 120.

Processing resource 110 may fetch, decode, and execute instructions stored on storage medium 120 to perform the functionalities described above in relation to instructions 122, 124, 126, 128, 130, 140, 142, 144, 146, and 148. In other examples, the functionalities of any of the instructions of storage medium 120 may be implemented in the form of electronic circuitry, in the form of executable instructions encoded on a machine-readable storage medium, or a combination thereof. In the example of FIG. 1C, storage medium 120 may be implemented by one machine-readable storage medium, or multiple machine-readable storage media.

As described above in relation to FIG. 1A, instructions 122 may receive a write request 102 containing write data. Instructions 124 may receive the write data from write request 102 and store the write data in a data cache. Instructions 126 may analyze the data in the data cache, including the write data, and apply a page fit process to the write data. Instructions 128 may cause the generation of a virtual page table entry in a virtual page table for the processed write data. As described above in relation to FIGS. 1A and 4, the virtual page table entry may include a compression index and a page address. Instructions 130 may perform an inline compression of the processed write data to compress and store the processed write data in a compressed page at a location associated with the compression index. As described above in relation to FIGS. 1A and 5, the compressed page may include compressed data and compression metadata that may include a reference count, a compressed page offset, and a virtual page address.

In the example of FIG. 1C, instructions 140 may receive a read-modify-write (RMW) request to modify the write data and re-write modified write data. A read-modify-write request, as described herein, may refer to a message or command to retrieve (i.e., read) and re-write or modify previously written data. In some examples, RMW request 106 may be received from a user (e.g., saving a previously saved file). In other examples, RMW request 106 may be received from a process or task as part of a larger transaction or operation. In some examples, RMW request 106 may include a virtual page address for the write data that is to be modified.

In some examples, as described above in relation to FIG. 1B, the location of the write data may be determined via the virtual page table and the compression metadata. In some such examples, a virtual page address for the write data may be used to identify the appropriate virtual page table entry within the virtual page table. Based (at least in part) on the page address identified in the virtual page table, the compressed page within which the write data is located may be identified and retrieved. Using the compression index identified in the virtual page table entry, and the compression metadata of the compressed page, the location of the write data within the compressed page may be determined. Based (at least in part) on the compressed page offset within the compression metadata of the compressed page, the compressed size of the write data may be determined.

Instructions 142 may receive the modified write data from RMW request 106 and store the modified write data in the data cache. Instructions 144 may analyze the modified write data and apply a page re-fit process to the modified write data to determine whether the modified write data will fit in the compressed page at the compression index. In some examples, the page re-fit process may determine the size of the compressed write data via the virtual page table entry and/or the compression metadata. In other examples, the page re-fit process may receive this information. The page re-fit process may also estimate or predict a size of the modified write data after compression. In some examples, the page re-fit process may estimate this size based on one or more compression algorithms. Based (at least in part) on a comparison of the size of the compressed write data and the estimated size of the modified write data, the page re-fit process may determine whether the modified write data will fit in the compressed page at the compression index.

Instructions 146 may receive or otherwise obtain the modified write data (as well as any other data to be re-stored in the compressed page) from the data cache after the page re-fit process has been applied. Based (at least in part) on a determination that the modified write data will fit in the compressed page at the compression index, instructions 146 may perform an inline compression of the modified write data to compress and store the modified write data in the compressed page at the location associated with the compression index. In some examples, prior to performing the inline compression, the compressed page may first be located and retrieved, as described above in relation to FIG. 1B. In some such examples, the compressed page may be stored in the compressed cache. The compressed page may also be decompressed and its data may be stored in the data cache, as described above in relation to FIG. 1B. In some examples, inline compression may be achieved using any of a number of suitable compression algorithms, including (but not limited to) Lempel-Ziv-Oberhumer® (LZO), LZ77®, LZ4®, and Snappy®.

The modified write data may be stored in the compressed page at the location associated with the compression index in the page compression table entry for the write data. For example, if the write data was located at the first virtual page within the compressed page (e.g., at compression index "0"), the modified write data would begin at the same byte location within the compressed page. Based (at least in part) on a determination that the modified write data fits in the compressed page at the location associated with the compression index, the compression metadata and the virtual page table entry may not need to be modified. The compressed page is described in more detail above in relation to FIG. 5.

If the page re-fit process determines that the modified write data will not fit in the compressed page at the location associated with the compression index, in some examples, a page fit process may be applied to the modified write data. In some examples, the page fit process may analyze the modified write data in the data cache as well as other data in the data cache to determine a best fit for data in a new compressed page. In some such examples, the page fit process may estimate the size of data within the data cache based on one or more compression algorithms. Based (at least in part) on the estimated size of the modified write data and the estimated size(s) of other data within the data cache, the page fit process may ascertain a new compressed page with a "best fit" having a suitable number of virtual pages of data and organized in a suitable order. In some examples, the page fit process may analyze whether the modified write data and other data within the data cache may be accessed together in ascertaining which data to include in the new compressed page. In other examples, the page fit process may analyze how frequently or infrequently data may be accessed in determining which data to include in the new compressed page, Very frequently accessed data, in some such examples, may not be included in the compressed page. The page fit process may additionally, in some examples, generate or determine a compression index and a page address for the modified write data and other data within the new compressed page. The page fit process may also generate or determine the compression metadata for the data within the new compressed page.

Based (at least in part) on the determination that the modified write data will not fit in the compressed page at the location associated with the compression index, instructions 148 may cause the generation of a new virtual page table entry in the virtual page table for the modified write data. The new virtual page table entry may include a new compression index and a new page address. In some examples, instructions 146 may receive the new compression index and/or the new page address from the page fit process.

As described above in relation to FIGS. 1A and 1B, the virtual page table may refer to a table or other suitable data structure that includes one or more virtual page table entries. As also described above in relation to FIGS. 1A and 1B, the virtual page table entry may refer to a row, a line, or other suitable portion of a virtual page table that aids in associating a virtual memory address with a physical memory address by way of compression metadata. Likewise, the new virtual page table entry, similar to the virtual page table entry described above, may be associated with a virtual page number or virtual page address and may include a new compression index and a new page address.

The new compression index, like the compression index described above in relation to FIGS. 1A-B and 4, may refer to a particular virtual page within a compressed page. Similarly, the new compression index may refer to a particular virtual page with a new compressed page. The new page address, like the page address described above in relation to FIGS. 1A-B and 4, may refer to a physical page. In some such examples, the new page address may be a physical page address for a new compressed page. In other such examples, the new page address may be a physical page number from which a physical page address can be generated for a new compressed page.

Based (at least in part) on the determination that the modified write data will not fit in the compressed page, instructions 148 may further receive or otherwise obtain data from the data cache, including the modified write data, to be stored in a new compressed page. The new compressed page, like the compressed page described above in relation to FIGS. 1A-B and 5, may include compressed data and compression metadata. In some examples, instructions 148 may receive or otherwise obtain one or more virtual pages of data, including the modified write data, to be compressed into the new compressed page. In one such example, the modified write data may be one (or more) of several virtual pages to be compressed into a single new compressed page. Instructions 148 may perform an inline compression of the modified write data (and any other data to be stored in the new compressed page) to store the modified write data in the new compressed page as compressed modified write data. Inline compression may be achieved using any of a number of suitable compression algorithms, including (but not limited to) Lempel-Ziv-Oberhumer® (LZO), LZ77®, LZ4®, and Snappy®.

The modified write data may be stored in the new compressed page at a location associated with the new compression index in the new page compression table entry. For example, a new compression index of "0" may indicate that the modified write data is located as the first virtual page within the new compressed page. Similarly, a new compression index of "1" may indicate that the modified write data is located as the second virtual page within the new compressed page. In such an example, the first virtual page may be occupied by other data. In some examples, the new compressed page may be stored in secondary memory, tertiary memory, or off-line or external memory.

In addition to the compressed data within the new compressed page, the new compressed page may include new compression metadata associated with the compressed data. In some examples, instructions 148 may receive new compression metadata from a page fit process for the new compressed page. The new compression metadata, like the compression metadata described above in relation to FIGS. 1A-B and 5, may refer to data within a compressed page that provides information about compressed data in the (new) compressed page. In some examples, instructions 148 may perform an inline compression of the new compression metadata along with the modified write data and any other data to be stored in the new compressed page. In other examples, instructions 148 may perform an inline compression of just the modified write data (and any other data to be stored in the compressed page) and the new compression data may be stored in the new compressed page in an uncompressed format.

Similar to the compression metadata described above in relation to FIGS. 1A-B and 5, the new compression metadata may include, among other things, a new reference count, a new compressed page offset, and a new virtual page address. Each of the new reference count, the new compressed page offset, and the new virtual page address may represent separate fields made up of one or more bits that provide information about the new compressed page and the compressed data within the new compressed page.

The new reference count, like the reference count described above in relation to FIGS. 1A-B and 5, may refer to the number of virtual pages within a compressed page. For instance, for a new compressed page that includes two virtual pages, the new reference count may include the value "2" or may otherwise indicate that the new compressed page includes two virtual pages. Similarly, for a new compressed page that includes 8 virtual pages, the new reference count may include the value "8" or may otherwise indicate that the new compressed page includes eight virtual pages.

The new compressed page offset, like the compressed page offset described above in relation to FIGS. 1A-B and 5, may refer to an offset that specifies where the data associated with each virtual page in a compressed page is located within that compressed page. In some such examples, each virtual page within a new compressed page may be associated with its own new compressed page offset. Accordingly, a new compressed page holding several virtual pages may have several different new compressed page offset fields. The new compressed page offset may be represented by a byte number. In one example in which the modified write data may be stored in a first virtual page within the new compressed page, the new compressed page offset for the modified write data may be "0." In another example in which the modified write data may be stored in a first virtual page within the new compressed page, but the new compressed page begins with new compression metadata, the new compressed page offset for the modified write data may be a byte value that reflects the size of the new compression metadata. Similarly, in an example in which the modified write data may be stored as a second virtual page within the new compressed page, the new compressed page offset for the modified write data may be a byte value that reflects the size of the data in the first virtual page. The new compressed page offset for each virtual page within the new compressed page may allow for easy calculation of the size of the virtual pages.

The new virtual page address, like the virtual page address described above in relation to FIGS. 1A-B and 5, may refer to a virtual page. In some such examples, the new virtual page address may be an address for a virtual page. In other such examples, the new virtual page address may be a virtual page number from which a virtual page address can be generated for a virtual page. In some examples, each virtual page within a new compressed page may be associated with its own virtual page address. The new virtual page address may allow for efficient look-up of a virtual page's corresponding new virtual page table entry when necessary.

The new compression metadata, like the compression metadata described above in relation to FIGS. 1A-B and 5, may also include additional metadata such as an algorithm and version identifier or an unused space identifier. The algorithm and version identifier and the unused space identifier may represent separate fields made up of one or more bits that provide additional information about the new compressed page and the compressed data within the new compressed page. In some examples, the algorithm and version identifier may identify the compression algorithm and the version of the compression algorithm used to compress the data. In some such examples, this may aid in decompression of the data within the new compressed page.

In some examples, an unused space identifier may identify the amount of unused space at the end of the new compressed page. In some examples, the unused space identifier may aid in determining the size of the last virtual page stored in the new compressed page. In other examples, the unused space identifier may instead be a used length identifier.

Based (at least in part) on the determination that the modified write data will not fit in the compressed page at the location associated with the compression index, instructions 148 may further access and update the compression metadata of the compressed page. In one example, instructions 148 may update the reference count of the compression metadata to reflect that the compressed page includes one or fewer virtual pages. In another example, instructions 148 may update the virtual page address with a null value or character to reflect that the virtual page is no longer found within the compressed page. In some examples, the virtual page table entry for the processed write data may also be modified. In one example, the virtual page table entry may be removed. In another example, the virtual page table entry may be populated with a "0" or other character or value to indicate that it is an empty entry. In yet other examples, the virtual page table entry for the processed write data may simply be identified as an available entry to be rewritten. In other examples, the new virtual page table entry for the modified write data may be written into the location of the virtual page table entry for the processed write data.

In some examples, an efficiency process may analyze and review the compression metadata of each compressed page within memory to determine whether two or more compressed pages may be consolidated. In some examples, the efficiency process may review the reference count and/or the unused space fields of each compressed page to determine whether several pages should be consolidated. If, for example, several compressed pages no longer contain the maximum number of allowable virtual pages and/or have a certain percentage or byte number of unused space, the efficiency process, similar to the page fit process described above, may determine a "best fit" for the virtual pages within the compressed pages. In such an example, the efficiency process may consolidate the compressed pages to, for instance, a single compressed page. In some examples, the efficiency process may analyze and review the compression metadata of the compressed pages dynamically, as additional space may be needed. In other examples, the efficiency process may continually analyze and review the compression metadata of the compressed pages. In yet other examples, the efficiency process may be activated with the reference count for a number of compressed pages falls below a certain number or when the unused space for a number of compressed pages exceeds a certain amount.

In some examples, instructions 122, 124, 126, 128, 130, 140, 142, 144, 146, and 148 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 122, 124, 126, 128, 130, 140, 142, 144, 146, and 148 may be part of an application, applications, or component(s) already installed on device 100 including processing resource 110. In such examples, the storage medium 120 may include memory such as a hard drive, solid state drive, or the like. In some examples, functionalities described herein in relation to FIG. 1C may be provided in combination with functionalities described herein in relation to any of FIGS. 1A-B and 2-5.

Figure 2A:
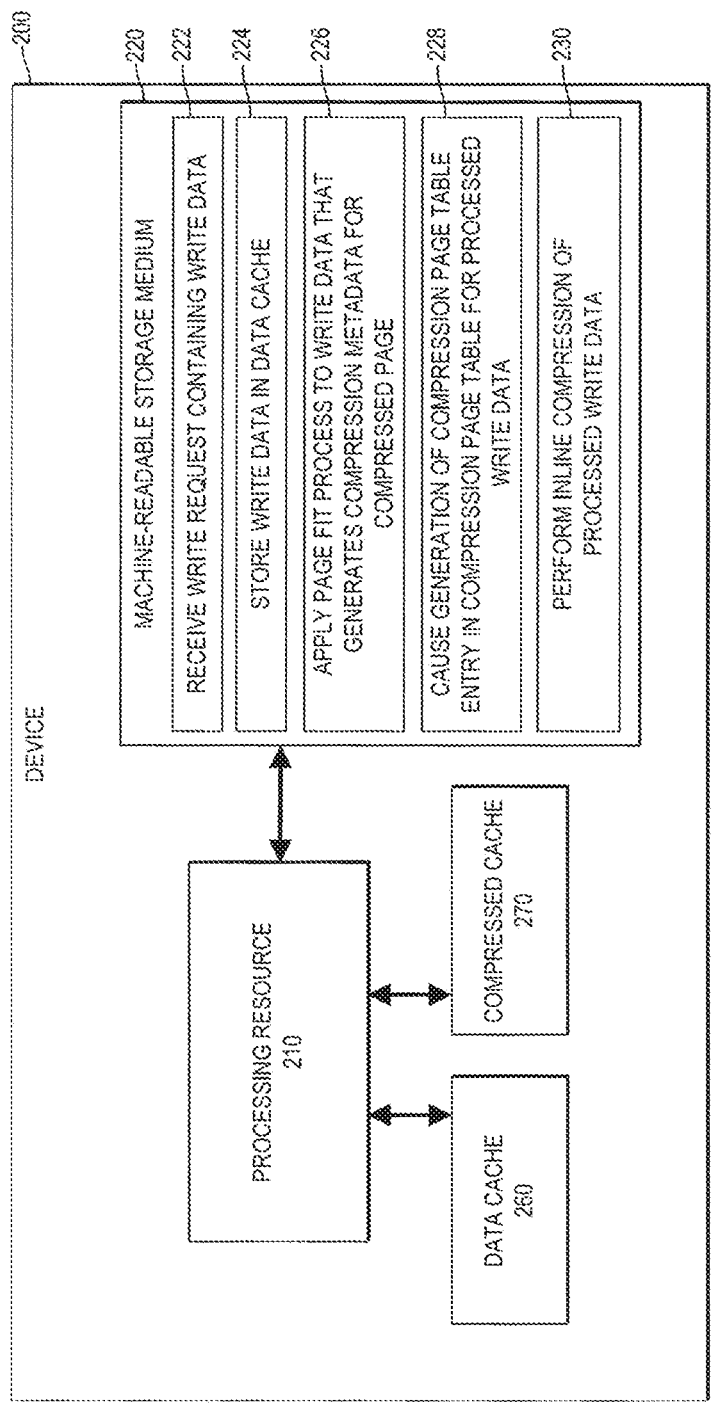
FIG. 2A is a block diagram of an example device having a data cache, a compressed cache, and instructions to apply a page-fit process to data that generates compression metadata for a compressed page.

FIG. 2A is a block diagram of an example device 200 block diagram having a data cache 260 and a compressed cache 270. As described above in relation to FIGS. 1A-C, data cache 260 may refer to any component that stores data such that future requests for that data may be served or completed more quickly than if that data were to be stored in a slower data source such as a remote server. Compressed cache 270, as described above in relation to FIG. 1B, may refer to any component that stores a compressed page such that future requests for the compressed page may be served or completed more quickly than if the compressed page were to be stored in a slower data source such as a remote server.

Device 200 also includes a processing resource 210 and may be any networking or computing device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource.

As depicted in FIG. 2A, device 200 may also include a machine-readable storage medium 220 comprising (e.g., encoded with) instructions 222, 224, 226, 228, and 230 executable by processing resource 210 to implement functionalities described herein in relation to FIG. 2A. In some examples, storage medium 220 may include additional instructions. In other examples, the functionalities described herein in relation to instructions 222, 224, 226, 228, 230, and any additional instructions described herein in relation to storage medium 220, may be implemented at least in part in electronic circuitry (e.g., via components comprising any combination of hardware and programming to implement the functionalities described herein). In some examples, device 200 may be a controller node for a storage platform or may be located within a controller node for a storage platform.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 210 may fetch, decode, and execute instructions stored on storage medium 220 to perform the functionalities described above in relation to instructions 222, 224, 226, 228, and 230. In other examples, the functionalities of any of the instructions of storage medium 220 may be implemented in the form of electronic circuitry, in the form of executable instructions encoded on a machine-readable storage medium, or a combination thereof. In the example of FIG. 2A, storage medium 220 may be implemented by one machine-readable storage medium, or multiple machine-readable storage media.

Instructions 222 may receive a write request containing write data, as described above in relation to instructions 122 in FIG. 1A. Instructions 224 may store the write data in data cache 260, as described above in relation to instructions 124 of FIG. 1A. Instructions 226 may apply a page fit process to the write data, as described above in relation to instructions 126 in FIG. 1A. As described above, the page fit process may also generate a compression metadata for a compressed page. In some examples, the compression metadata may include a reference count, a compressed page offset, and a virtual page address, as described above in relation to FIGS. 1A-C and 5. In other examples, the compression metadata may also include additional fields such as an algorithm and version identifier and an unused space identifier, as described above in relation to FIGS. 1A-C and 5.

Instructions 228 may cause the generation of a virtual page table entry in a virtual page table for the processed write data, as described above in relation to instructions 128 of FIG. 1A. As described above, the virtual page table may refer to a table or other suitable data structure that includes one or more virtual page table entries, A virtual page table entry, as described above, may refer to a row, a line, or other suitable portion of a virtual page table that aids in associating a virtual memory address with a physical memory address by way of compression metadata. The virtual page table entry may include a compression index and a page address, as described above in relation to FIGS. 1A and 4. As described above, the compression index may refer to a particular virtual page that contains the processed write data within a compressed page and the page address may refer to a physical page. In some examples, the page address may be a physical page address for a compressed page. In other examples, the page address may be a physical page number from which a physical page address can be generated for a compressed page. The virtual page table entry may additionally include other suitable fields. The data or information within the virtual page table entry may be referred to as metadata.

Referring again to FIG. 2A, instructions 230 may perform an inline compression of the processed write data to compress and store the write data in the compressed page at a location associated with the compression index, as described above in relation to instructions 130 of FIG. 1A. As described above in relation to FIGS. 1A-C and 5, the compressed page may include the compression metadata having the reference count, the compressed page offset, and the virtual page address.

In some examples, instructions 222, 224, 226, 228, and 230 may be part of an installation package that, when installed, may be executed by processor 210 to implement the functionalities described above. In such examples, storage medium 220 may be a portable medium, such as a CD, DVD, or flash drive, or a memory maintained by a server from which the installation package can be downloaded and installed. In other examples, instructions 222, 224, 226, 228, and 230 may be part of an application, applications, or component(s) already installed on computing device 200 including processor 210, In such examples, the storage medium 220 may include memory such as a hard drive, solid state drive, or the like. In some examples, functionalities described herein in relation to FIG. 2A may be provided in combination with functionalities described herein in relation to any of FIGS. 1, 2B-C, and 3-5.

Figure 2B:
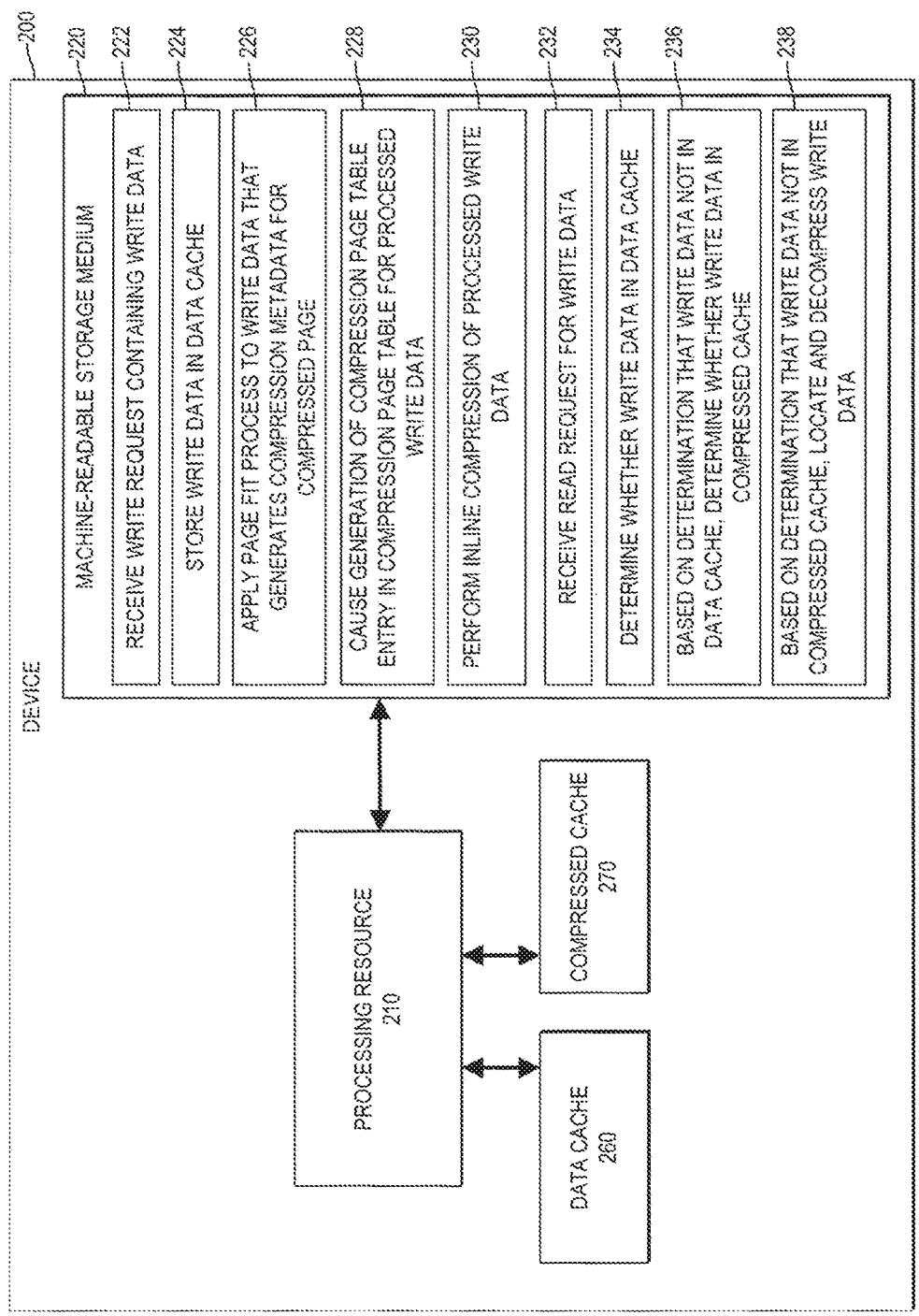
FIG. 2B is a block diagram of an example device having a data cache, a compressed cache, and instructions to receive a read request for the write data, to determine a location of the write data, and based on the location, to decompress the write data.

Further examples are described herein in relation to FIG. 2B, which is a block diagram of an example device 200 block diagram having a data cache 260, a compressed cache 270, and a machine-readable storage medium that includes instructions to receive a read request. The example of FIG. 2B includes device 200, processing resource 210, data cache 260, compressed cache 270, and machine-readable storage medium 220 comprising instructions 222, 224, 226, 228, and 230, as described above in relation to FIG. 2A, As described above, data cache 260 may refer to any component that stores data such that future requests for that data may be served or completed more quickly than if that data were to be stored in a slower data source such as a remote server. Compressed cache 270, as described above, may refer to any component that stores a compressed page such that future requests for the compressed page may be served or completed more quickly than if the compressed page were to be stored in a slower data source such as a remote server. The example of FIG. 2B further includes the machine-readable storage medium 220 comprising instructions 232, 234, 236, and 238 executable by processing resource 210 to implement functionalities described herein in relation to FIG. 2B.

In some examples, storage medium 220 may include additional instructions. In other examples, the functionalities described herein in relation to instructions 222, 224, 226, 228, 230, 232, 234, 236, 238, and any additional instructions described herein in relation to storage medium 220, may be implemented at least in part in electronic circuitry (e.g., via components comprising any combination of hardware and programming to implement the functionalities described herein), In some examples, device 200 may be a controller node for a storage platform or may be located within a controller node for a storage platform.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 210 may fetch, decode, and execute instructions stored on storage medium 220 to perform the functionalities described above in relation to instructions 222, 224, 226, 228, 230, 232, 234, 236, and 238. In other examples, the functionalities of any of the instructions of storage medium 220 may be implemented in the form of electronic circuitry, in the form of executable instructions encoded on a machine-readable storage medium, or a combination thereof. In the example of FIG. 2B, storage medium 220 may be implemented by one machine-readable storage medium, or multiple machine-readable storage media.

Instructions 222 may receive a write request containing write data, as described above in relation to FIG. 2A, Instructions 224 may store the write data in data cache 260, as described above in relation to FIG. 2A. Instructions 226 may apply a page fit process to the write data, as described above in relation to FIG. 2A. As described above, the page fit process may generate a compression metadata for a compressed page. In some examples, the compression metadata may include a reference count, a compressed page offset, and a virtual page address, as described above in relation to FIG. 2A. In other examples, the compression metadata may also include additional fields such as an algorithm and version identifier and an unused space identifier, as described above in relation to FIG. 2A.

Instructions 228 may cause the generation of a virtual page table entry in a virtual page table for the processed write data, as described above in relation to FIGS. 2A and 4, As described above, the virtual page table may refer to a table or other suitable data structure that includes one or more virtual page table entries. A virtual page table entry, as described above, may refer to a row, a line, or other suitable portion of a virtual page table that aids in associating a virtual memory address with a physical memory address by way of compression metadata. The virtual page table entry may include a compression index and a page address as described above in relation to FIG. 2A. The compression index may refer to a particular virtual page that contains the processed write data within a compressed page and the page address may refer to a physical page. In some examples, the page address may be a physical page address for a compressed page. In other examples, the page address may be a physical page number from which a physical page address can be generated for a compressed page. The virtual page table entry may additionally include other suitable fields. The data or information within the virtual page table entry may be referred to as metadata.

Instructions 230 may perform an inline compression of the processed write data to compress and store the write data in the compressed page at a location associated with the compression index, as described above in relation to FIG. 2A. As described above, the compressed page may include the compression metadata having the reference count, the compressed page offset, and the virtual page address.

Instructions 232 may receive a read request for the write data, as described above in relation to instructions 132 of FIG. 1B. As described above, in some examples, the read request may include a virtual page address for the write data. Instructions 234 may determine whether the write data is located in data cache 260, as described above in relation to instructions 134 of FIG. 1B. If, as described above in relation to FIG. 1B, the write data is located in data cache 260, the write request may be completed by, for example, retrieving and sending the write data to the requesting entity. Based (at least in part) on a determination that the write data is not located in the data cache, instructions 236 may determine whether the write data is located in compressed cache 270, as described above in relation to instructions 136 of FIG. 1B. If, as described above in relation to FIG. 1B, the write data is located in compressed cache 270, the write data may be completed by, for example, retrieving, decompressing, and sending the write data to the requesting entity. Based (at least in part) on a determination that the write data is not located in the compressed cache, instructions 238 may locate and decompress the write data, as described above in relation to instructions 138 of FIG. 1B. As described above, instructions 238 may locate and retrieve the write data via the virtual page table and the compression metadata.

In some examples, instructions 222, 224, 226, 228, 230, 232, 234, 236, and 238 may be part of an installation package that, when installed, may be executed by processor 210 to implement the functionalities described above. In such examples, storage medium 220 may be a portable medium, such as a CD, DVD, or flash drive, or a memory maintained by a server from which the installation package can be downloaded and installed. In other examples, instructions 222, 224, 226, 228, 230, 232, 234, 236, and 238 may be part of an application, applications, or component(s) already installed on computing device 200 including processor 210. In such examples, the storage medium 220 may include memory such as a hard drive, solid state drive, or the like. In some examples, functionalities described herein in relation to FIG. 2B may be provided in combination with functionalities described herein in relation to any of FIGS. 1, 2A, 2C, and 3-5.

Figure 2C:
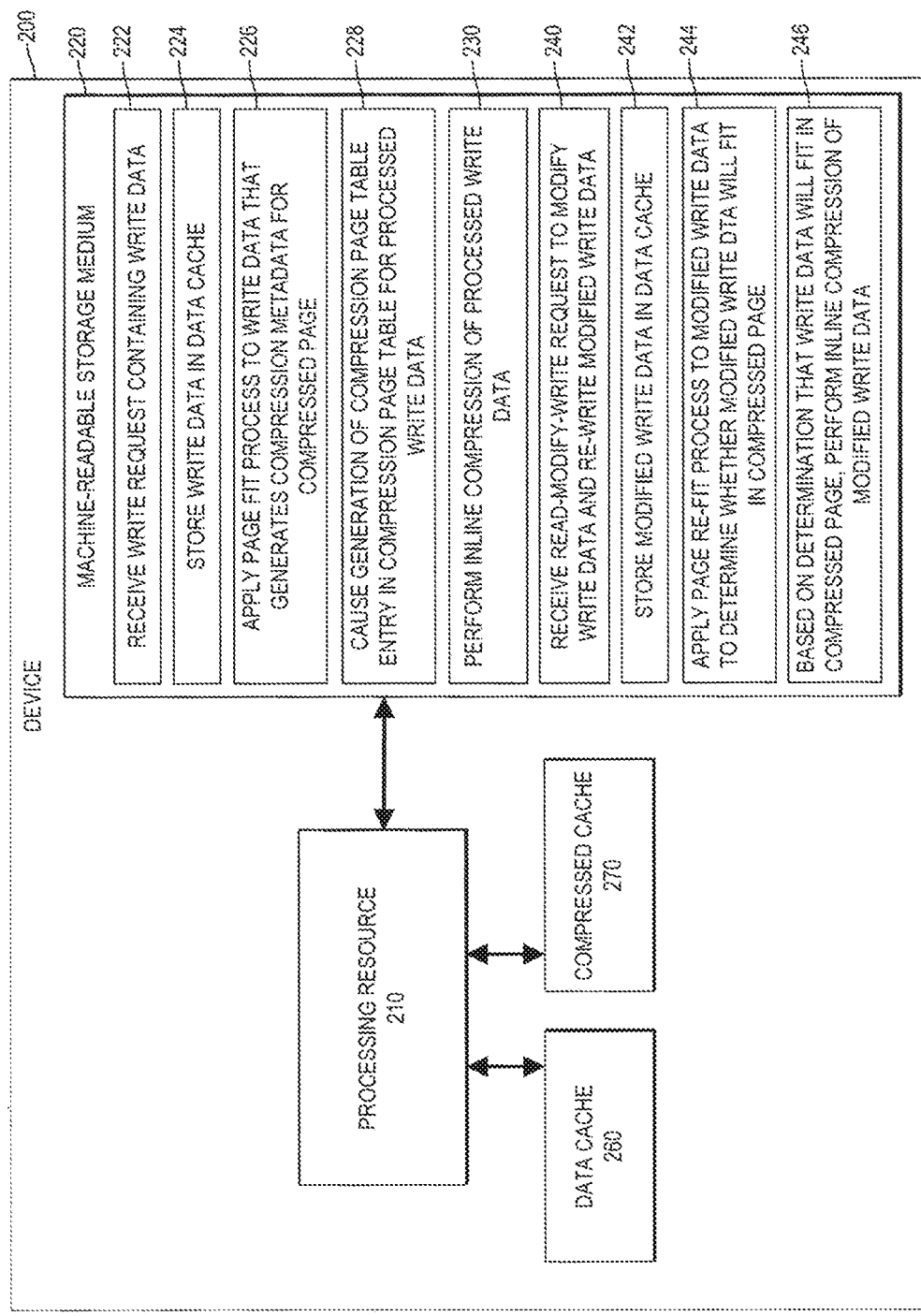
FIG. 2C is a block diagram of an example device having a data cache, a compressed cache, and instructions to receive a read-modify-write request to modify the write data and to apply a page re-fit process to determine whether the modified write data will fit in the compressed page.

Further examples are described herein in relation to FIG. 2C, which is a block diagram of an example device 200 block diagram having a data cache 260, a compressed cache 270, and a machine-readable storage medium that includes instructions to receive a read-modify-write request. The example of FIG. 2C includes device 200, processing resource 210, data cache 260, compressed cache 270, and machine-readable storage medium 220 comprising instructions 222, 224, 226, 228, and 230, as described above in relation to FIG. 2A. As described above, data cache 260 may refer to any component that stores data such that future requests for that data may be served or completed more quickly than if that data were to be stored in a slower data source such as a remote server. Compressed cache 270, as described above, may refer to any component that stores a compressed page such that future requests for the compressed page may be served or completed more quickly than if the compressed page were to be stored in a slower data source such as a remote server. The example of FIG. 2C further includes the machine-readable storage medium 220 comprising instructions 240, 242, 244, and 246 executable by processing resource 210 to implement functionalities described herein in relation to FIG. 2O.

In some examples, storage medium 220 may include additional instructions. In other examples, the functionalities described herein in relation to instructions 222, 224, 226, 228, 230, 240, 242, 244, 246, and any additional instructions described herein in relation to storage medium 220, may be implemented at least in part in electronic circuitry (e.g., via components comprising any combination of hardware and programming to implement the functionalities described herein). In some examples, device 200 may be a controller node for a storage platform or may be located within a controller node for a storage platform.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 210 may fetch, decode, and execute instructions stored on storage medium 220 to perform the functionalities described above in relation to instructions 222, 224, 226, 228, 230, 240, 242, 244, and 246. In other examples, the functionalities of any of the instructions of storage medium 220 may be implemented in the form of electronic circuitry, in the form of executable instructions encoded on a machine-readable storage medium, or a combination thereof. In the example of FIG. 2C, storage medium 220 may be implemented by one machine-readable storage medium, or multiple machine-readable storage media.

Instructions 222 may receive a write request containing write data, as described above in relation to FIG. 2A. Instructions 224 may store the write data in data cache 260, as described above in relation to FIG. 2A. Instructions 226 may apply a page fit process to the write data, as described above in relation to FIG. 2A. As described above, the page fit process may generate a compression metadata for a compressed page. In some examples, the compression metadata may include a reference count, a compressed page offset, and a virtual page address, as described above in relation to FIG. 2A. In other examples, the compression metadata may also include additional fields such as an algorithm and version identifier and an unused space identifier, as described above in relation to FIG. 2A.

Instructions 228 may cause the generation of a virtual page table entry in a virtual page table for the processed write data, as described above in relation to FIGS. 2A and 4. As described above, the virtual page table may refer to a table or other suitable data structure that includes one or more virtual page table entries. A virtual page table entry, as described above, may refer to a row, a line, or other suitable portion of a virtual page table that aids in associating a virtual memory address with a physical memory address by way of compression metadata. The virtual page table entry may include a compression index and a page address as described above in relation to FIG. 2A. The compression index may refer to a particular virtual page that contains the processed write data within a compressed page and the page address may refer to a physical page. In some examples, the page address may be a physical page address for a compressed page. In other examples, the page address may be a physical page number from which a physical page address can be generated for a compressed page. The virtual page table entry may additionally include other suitable fields. The data or information within the virtual page table entry may be referred to as metadata.

Instructions 230 may perform an inline compression of the processed write data to compress and store the write data in the compressed page at a location associated with the compression index, as described above in relation to FIG. 2A. As described above, the compressed page may include the compression metadata having the reference count, the compressed page offset, and the virtual page address.

Instructions 240 may receive a RMW request to modify the write data and re-write modified write data, as described above in relation to instructions 140 of FIG. 1C. As described above, in some examples, the RMW request may include a virtual page address for the write data that is to be modified. Instructions 242 may store the modified write data in data cache 260, as described above in relation to instructions 142 of FIG. 1C, Instructions 244 may apply a page re-fit process to the modified write data to determine whether the modified write data will fit in the compressed page at the location associated with the compression index, as described above in relation to instructions 144 of FIG. 1C. As described above, in some examples, the page re-fit process may estimate or predict the size of the modified write data. The page re-fit process may also determine the size of the compressed write data via the compression metadata. Based (at least in part) on a comparison of the size of the compressed write data and the estimated size of the modified write data, the page re-fit process may determine whether the modified write data will fit in the compressed page at the compression index.

Based (at least in part) on a determination that the modified write data will fit, instructions 246 may perform an inline compression of the modified write data to compress and store the modified write data in the compressed page at the location associated with the compression index, as described above in relation to instructions 146 of FIG. 1C.

In some examples, instructions 222, 224, 226, 228, 230, 240, 242, 244, and 246 may be part of an installation package that, when installed, may be executed by processor 210 to implement the functionalities described above. In such examples, storage medium 220 may be a portable medium, such as a CD, DVD, or flash drive, or a memory maintained by a server from which the installation package can be downloaded and installed. In other examples, instructions 222, 224, 226, 228, 230, 240, 242, 244, and 246 may be part of an application, applications, or component(s) already installed on computing device 200 including processor 210. In such examples, the storage medium 220 may include memory such as a hard drive, solid state drive, or the like. In some examples, functionalities described herein in relation to FIG. 2O may be provided in combination with functionalities described herein in relation to any of FIGS. 1, 2A-B, and 3-5.

Figure 3A:
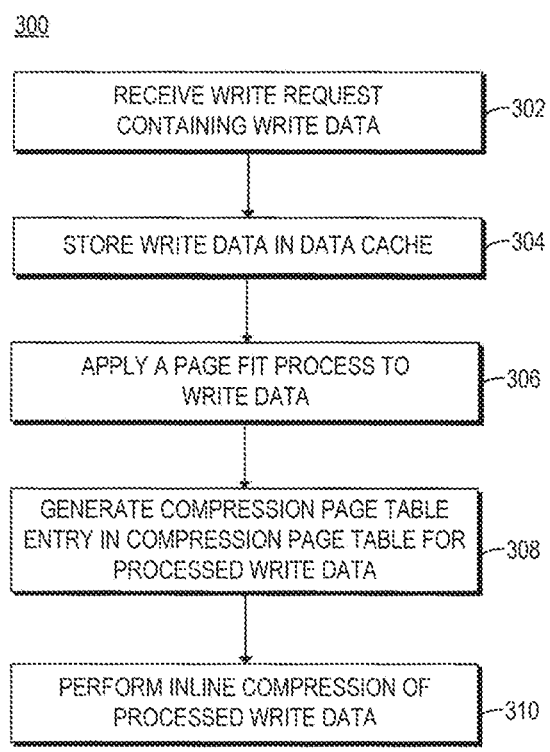
FIG. 3A is a flowchart of an example method for managing memory including receiving a write request containing write data, applying a page fit process to the write data, and performing an inline compression to compress and store the processed write data in a compressed page having a compression metadata.

FIG. 3A is a flowchart of an example method 300 for managing memory including receiving a write request containing write data, applying a page fit process to the write data, and performing an inline compression to compress and store the processed write data in a compressed page having a compression metadata Although execution of method 300 is described below with reference to device 200 of FIG. 2A, other suitable systems for the execution of method 300 can be utilized (e.g., device 100 of FIG. 1A). Additionally, implementation of method 300 is not limited to such examples.

In the example of FIG. 3A, method 300 may be a method of device 200. At 302 of method 300, instructions 222 may receive a write request containing write data at device 200. This receipt may be performed as described above in relation to instructions 222 of FIG. 2A. At 304, instructions 224 may store the write data in data cache 260 at device 200, as described above in relation to instructions 224 of FIG. 2A. At 306, instructions 226 may apply a page fit process to the write data, as descried above in relation to instructions 226 of FIG. 2A.

At 308, instructions 228 may generate a virtual page table entry in a virtual page table for the processed write data, as described above in relation to instructions 228 of FIG. 2A. As described above, the virtual page table entry may include a compression index and a page address. At 310, instructions 230 may perform an inline compression of the processed write data to compress and store the processed write data in a compressed page at a location associated with the compression index, as described above in relation to instructions 230 of FIG. 2A. As described above, the compressed page may include a compression metadata having an algorithm and version identifier, a reference count, a compressed page offset, a virtual page address, and an unused space identifier.

Although the flowchart of FIG. 3A shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3A may be provided in combination with functionalities described herein in relation to any of FIGS. 1-2, 3B-C, and 4-5.

Figure 3B:
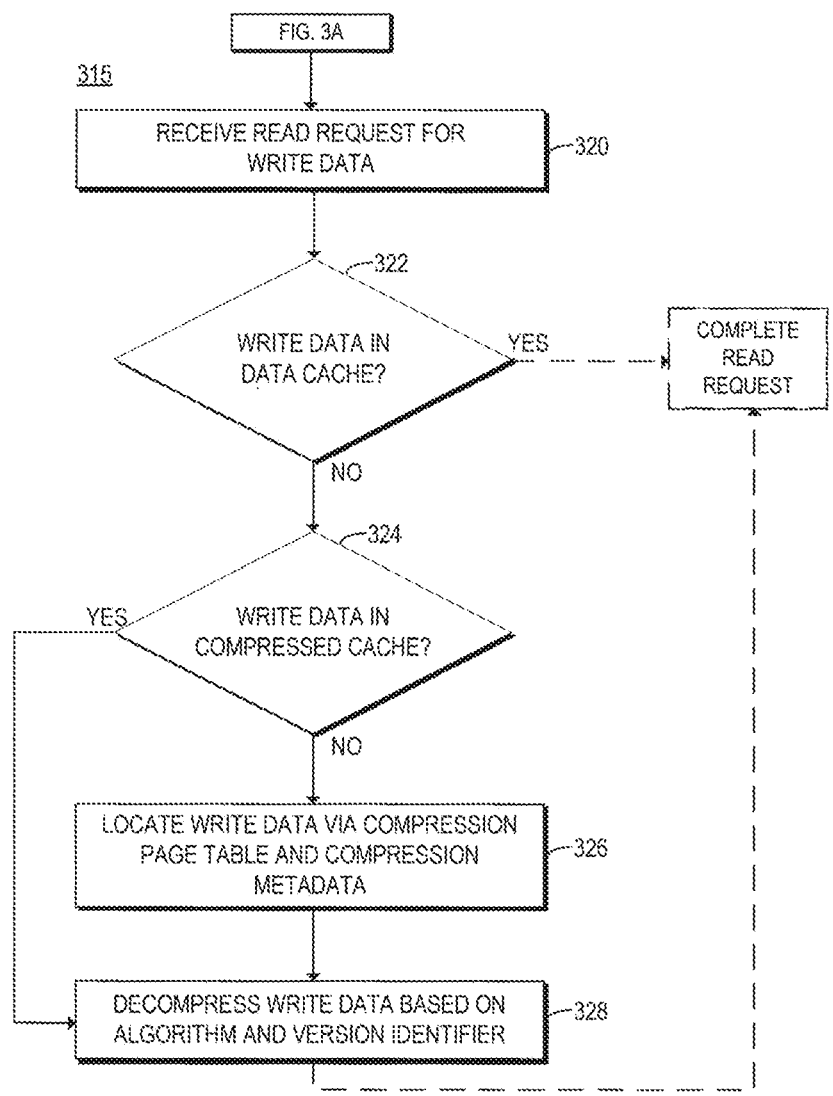
FIG. 3B a flowchart of an example method for managing memory including receiving a read request for the write data, determining a location of the write data, and based on the location, decompressing the write data.

FIG. 3B is a flowchart of an example method 315 for managing memory including receiving a read request for the write data, determining a location of the write data, and based on the location, decompressing the write data. Although execution of method 315 is described below with reference to device 200 of FIG. 2B, other suitable systems for the execution of method 315 can be utilized (e.g., device 100 of FIG. 1B). Additionally, implementation of method 315 is not limited to such examples.

In the example of FIG. 3B, method 315 may be a method of device 200 and may follow method 300 of FIG. 3A. At 320 of method 315, instructions 232 may receive a read request for the write data at device 200. This receipt may be performed as described above in relation to instructions 232 of FIG. 2B. At 322, instructions 234 may determine whether the write data is located in data cache 260, as described above in relation to instructions 234 of FIG. 2B. If it is determined that the write data is located in data cache 260, the write data may be retrieved and send to the requesting entity, completing the read request, as described above in relation to FIG. 2B. If, however, a determination is made that the write data is not located in data cache 260, method 315 may proceed to 324.

At 324, instructions 236 may determine whether the write data is located in compressed cache 270, as described above in relation to instructions 236 of FIG. 2B. If, at 324, it is determined that the write data is not located in compressed cache 260, method 315 may proceed to 326. At 326, instructions 238 may locate and retrieve the write data via the virtual page table and the compression metadata, as described above in relation to instructions 238 of FIG. 2B. At 328, the write data may be decompressed based on the algorithm and version identifier of the compression metadata. In some examples, once the write data has been located within its compressed page, the compression metadata may be analyzed to determine the compression algorithm and compression algorithm version used to compress the write data. Based on the compression algorithm and compression algorithm version, the compressed page, including the write data, may be decompressed using a corresponding decompression algorithm. In some examples, prior to decompressing the compressed page, the compressed page may first be stored in compressed cache 270. In some such examples, the decompressed data may then be stored in data cache 260 before being sent to the requesting entity to complete the read request. If, at 324, it is determined that the write data is located in compressed cache 260, method 315 may proceed to 328 and the write data may be decompressed.

Although the flowchart of FIG. 3B shows a specific order of performance of certain functionalities, method 315 is not limited to that order. For example, the functionalities shown in succession in the flowchart may be performed in a different order, may be executed concurrently or with partial concurrence, or a combination thereof. In some examples, functionalities described herein in relation to FIG. 3B may be provided in combination with functionalities described herein in relation to any of FIGS. 1-2, 3A, 3C, and 4-5.

Figure 3C:
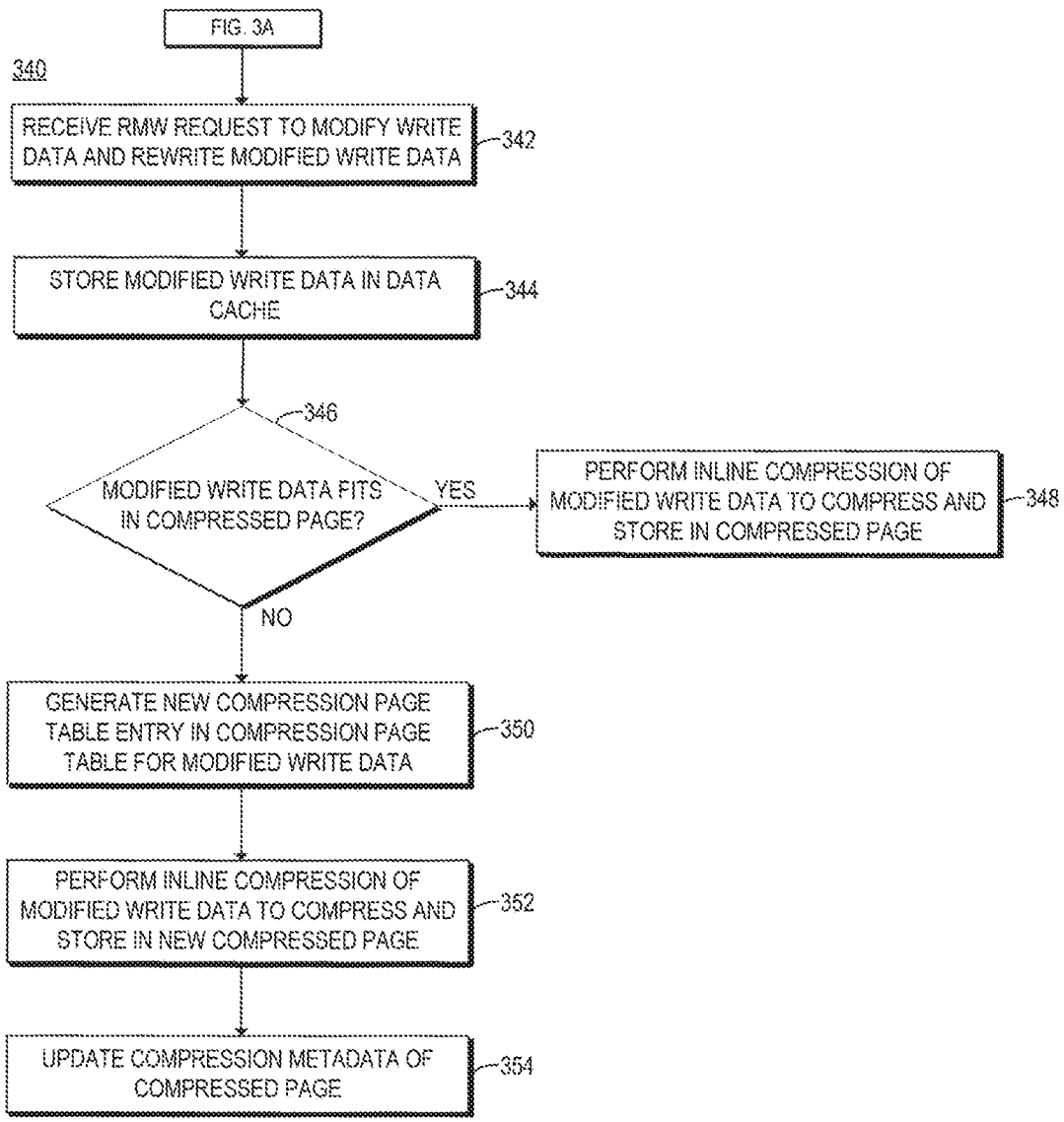
FIG. 3C is a flowchart of an example method for managing memory including receiving a read-modify-write request to modify the write data and applying a page re-fit process to determine whether the modified write data will fit in the compressed page, and based on that determination, performing an inline compression to the compressed page or performing an inline compression to a new compressed page.

FIG. 3C is a flowchart of an example method 340 for managing memory including receiving a read-modify-write request to modify the write data and applying a page re-fit process to determine whether the modified write data will fit in the compressed page, and based on that determination, performing an inline compression to the compressed page or performing an inline compression to a new compressed page. Although execution of method 340 is described below with reference to device 200 of FIG. 2C and device 100 of FIG. 1C, other suitable systems for the execution of method 340 can be utilized, Additionally, implementation of method 340 is not limited to such examples.

In the example of FIG. 3O, method 340 may be a method of device 100 and of device 200 and may follow after method 300 of FIG. 3A. At 342 of method 340, instructions 140 of FIG. 1C and instructions 240 of FIG. 2O may receive a read-modify-write request to modify the write data and re-write the modified write data at devices 100 and 200, respectively. This receipt may be performed as described above in relation to instructions 140 of FIG. 1C and instructions 240 of FIG. 2C. At 344, instructions 142 and instructions 242 may store the modified write data at device 100 and in data cache 260 at device 200, respectively, as described above in relation to instructions 142 of FIG. 1C and instructions 242 of FIG. 2C. At 346, instructions 144 and instructions 244 may apply a page re-fit process to the modified write data to determine whether the modified write data will fit in the compressed age at the location associated with the compression index, as descried above in relation to FIGS. 1C and 2C, respectively.

Based (at least in part) on a determination that the modified write data will fit, method 340 may proceed to 348. At 348, instructions 146 and instructions 246 will perform an inline compression of the modified write data to compress and store the modified write data in the compressed page at the location associated with the compression index, as described above in relation to FIGS. 1C and 2C, respectively.

If it is determined that the modified write data will not fit, method 340 may proceed to 350. At 350, instructions 148 may generate a new virtual page table entry in the virtual page table for the modified write data, as described above in relation to instructions 148 of FIG. 1C. The new virtual page table entry may include a new compression index and a new page address, as described above in relation to FIG. 1C and FIG. 2O. At 352, based (at least in part) on the determination that the modified write data will not fit, instructions 148 may perform an inline compression of the modified write data to compress and store the modified write data in a new compressed page, as described above in relation to instructions 148 of FIG. 1C. As described above, the new compressed page may include new compression metadata having a new algorithm and version identifier, a new reference count, a new compressed page offset, a new virtual page address, and a new unused space identifier. At 354, based (at least in part) on the determination that the modified write data will not fit, instructions 148 may further update the compression metadata of the compressed page, as described above in relation to instructions 148 of FIG. 1C.

Although the flowchart of FIG. 3C shows a specific order of performance of certain functionalities, method 340 is not limited to that order. For example, the functionalities shown in succession in the flowchart may be performed in a different order, may be executed concurrently or with partial concurrence, or a combination thereof. In some examples, functionalities described herein in relation to FIG. 3C may be provided in combination with functionalities described herein in relation to any of FIGS. 1-2, 3A-B, and 4-5.

What is claimed is:

1. An article comprising at least one non-transitory machine-readable storage medium comprising instructions executable by a processing resource of a device to:
    receive a write request containing write data;
    store the write data in a data cache;
    apply a page fit process to the write data;
    cause the generation of a virtual page table entry in a virtual page table for the processed write data, wherein the virtual page table entry includes a compression index and a page address; and
    perform an inline compression of the processed write data to compress and store the processed write data in a compressed page at a location associated with the compression index, wherein the compressed page includes a compression metadata having a reference count, a compressed page offset, and a virtual page address, and wherein the compression index refers to a virtual page within the compressed page and the page address represents a physical page address for the compressed page.

2. The article of claim 1 wherein the instructions further comprise instructions to:
    receive a read request for the write data;
    determine whether the write data is located in the data cache;
    based on a determination that the write data is not located in the data cache, determine whether the write data is located in a compressed cache; and
    based on a determination that the write data is not located in the compressed cache,
        locate the write data via the virtual page table and the compression metadata, and
        decompress the write data.

3. The article of claim 1 wherein the instructions further comprise instructions to:
    receive a read-modify-write request to modify the write data and re-write modified write data;
    store the modified write data in the data cache;
    apply a page re-fit process to the modified write data to determine whether the modified write data will fit in the compressed page at the location associated with the compression index; and
    based on a determination that the modified write data will fit, perform an inline compression of the modified write data to compress and store the modified write data in the compressed page at the location associated with the compression index.

4. The article of claim 3 wherein the instructions further comprise instructions to:
    based on a determination that the modified write data will not fit,
        cause the generation of a new virtual page table entry in the virtual page table for the modified write data, wherein the new virtual page table entry includes a new compression index and a new page address,
        perform an inline compression of the modified write data to compress and store the modified write data in a new compressed page, wherein the new compressed page includes a new compression metadata having a new reference count, a new compressed page offset, and a new virtual page address, and
        update the compression metadata of the compressed page.

5. The article of claim 1 wherein the page fit process fits up to eight virtual pages of data in the compressed page.

6. The article of claim 5 wherein the page fit process generates the compression metadata having the reference count, a compressed page offset for each of the up to eight pages, and a virtual page address for each of the up to eight pages.

7. The article of claim 5 wherein the compression index includes a value associated with one of the eight virtual pages.

8. The article of claim 1 wherein the compression metadata has an algorithm and version identifier, and an unused space identifier.

9. The article of claim 1 wherein the page fit process determines a best fit for the compressed data in the compressed page based on a data set in the data cache, wherein the data set includes the write data of the write request.

10. A device comprising:
a processing resource;
a data cache;
a compressed cache; and
a machine-readable storage medium encoded with instructions executable by the processing resource, the machine-readable storage medium comprising instructions to:
receive a write request containing write data;
store the write data in a data cache;
apply a page fit process to the write data that generates a compression metadata for a compressed page that includes a reference count, a compressed page offset, and a virtual page address;
cause the generation of a virtual page table entry in a virtual page table for the processed write data, wherein the virtual page table entry includes a compression index and a page address; and
perform an inline compression of the processed write data to compress and store the processed write data in the compressed page at a location associated with the compression index, wherein the compressed page includes the compression metadata having the reference count, the compressed page offset, and the virtual page address, and wherein the compression index identifies a virtual page within the compressed page and the page address represents a physical page address for the compressed page.

11. The device of claim 10, wherein the machine-readable storage medium further comprises instructions to:
receive a read request for the write data;
determine whether the write data is located in the data cache;
based on a determination that the write data is not located in the data cache, determine whether the write data is located in a compressed cache; and
based on a determination that the write data is not located in the compressed cache,
locate the write data via the virtual page table and the compression metadata, and
decompress the write data.

12. The device of claim 10, wherein the machine-readable storage medium further comprises instructions to:
receive a read-modify-write request to modify the write data and re-write modified write data;
store the modified write data in the data cache;
apply a page re-fit process to the modified write data to determine whether the modified write data will fit in the compressed page at the location associated with the compression index; and
based on a determination that the modified write data will fit, perform an inline compression of the modified write data to compress and store the modified write data in the compressed page at the location associated with the compression index.

13. A method for managing memory, wherein the method comprises:
receiving, at a device, a write request containing write data;
storing, at the device, the write data in a data cache;
applying a page fit process to the write data;
generating a virtual page table entry in a virtual page table for the processed write data, wherein the virtual page table entry includes a compression index and a page address; and
performing an inline compression of the processed write data to compress and store the processed write data in a compressed page at a location associated with the compression index, wherein the compressed page includes a compression metadata having an algorithm and version identifier, a reference count, a compressed page offset, a virtual page address, and an unused space identifier, and wherein the compression index identifies a virtual page within the compressed page and the page address represents a physical page address for the compressed page.

14. The method of claim 13, wherein the method further comprises:
receiving, at the device, a read request for the write data;
determining whether the write data is located in the data cache;
based on a determination that the write data is not located in the data cache, determining whether the write data is located in a compressed cache; and
based on a determination that the write data is not located in the compressed cache,
locating the processed data via the virtual page table and the compression metadata, and
decompressing the write data based on the algorithm and version identifier.

15. The method of claim 13, wherein the method further comprises:
receiving, at the device, a read-modify-write request to modify the write data and re-write modified data;
storing, at the device, the modified write data in the data cache;
applying a page re-fit process to the modified write data to determine whether the modified write data will fit in the compressed page at the location associated with the compression index; and
based on a determination that the modified write data will fit, performing an inline compression of the modified write data to compress and store the modified write data in the compressed page at the location associated with the compression index.

16. The method of claim 15, wherein the method further comprises:
based on a determination that the modified write data will not fit,
generating a new virtual page table entry in the virtual page table for the modified write data, wherein the new virtual page table entry includes a new compression index and a new page address,
performing an inline compression of the modified write data to compress and store the modified write data in a new compressed page, wherein the new compressed page includes a new compression metadata having a new algorithm and version identifier, a new reference count, a new compressed page offset, a new virtual page address, and a new unused space identifier, and updating the compression metadata of the compressed page.

\* \* \* \* \*